United States Patent
Kharbanda et al.

(10) Patent No.: US 12,266,065 B1
(45) Date of Patent: Apr. 1, 2025

(54) VISUAL INDICATORS OF GENERATIVE MODEL RESPONSE DETAILS

(71) Applicant: Google LLC, Mountain View, CA (US)

(72) Inventors: Harshit Kharbanda, Pleasanton, CA (US); Louis Wang, San Francisco, CA (US); Christopher James Kelley, Orinda, CA (US); Jessica Lee, Brooklyn, NY (US); Igor Bonaci, Canton Schwyz (CH); Daniel Valcarce Silva, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/409,268

(22) Filed: Jan. 10, 2024

Related U.S. Application Data

(60) Provisional application No. 63/616,304, filed on Dec. 29, 2023.

(51) Int. Cl.
   *G06T 19/00* (2011.01)
   *G06V 20/20* (2022.01)

(52) U.S. Cl.
   CPC ............ *G06T 19/006* (2013.01); *G06V 20/20* (2022.01)

(58) Field of Classification Search
   CPC ............................... G06T 19/006; G06V 20/20
   See application file for complete search history.

(56) References Cited

U.S. PATENT DOCUMENTS

| | | | | |
|---|---|---|---|---|
| 8,131,750 | B2* | 3/2012 | Bathiche | G06F 16/24573 |
| | | | | 707/777 |
| 9,875,258 | B1* | 1/2018 | Hsiao | G06F 16/5846 |
| 11,227,439 | B2* | 1/2022 | Bridgeman | G06T 19/006 |
| 11,263,821 | B1* | 3/2022 | Singh | G06T 19/006 |
| 11,748,577 | B1* | 9/2023 | Aberle | G06F 40/30 |
| | | | | 704/9 |
| 11,769,017 | B1* | 9/2023 | Gray | G06F 16/3328 |
| | | | | 704/9 |
| 11,847,168 | B2* | 12/2023 | Guo | G06N 20/00 |
| 11,941,678 | B1* | 3/2024 | Sadr | G06Q 30/0627 |
| 11,971,955 | B1* | 4/2024 | Chakraborty | G06F 3/04845 |
| 11,978,271 | B1* | 5/2024 | Kharbanda | G06V 20/70 |
| 11,983,806 | B1* | 5/2024 | Ramesh | G06V 10/77 |
| 12,079,292 | B1* | 9/2024 | Badr | G06F 16/9535 |
| 12,111,834 | B1* | 10/2024 | Carbune | G06F 16/24553 |
| 2014/0160157 | A1 | 6/2014 | Poulos et al. | |
| 2014/0240349 | A1 | 8/2014 | Tuukkanen | |
| 2016/0378861 | A1* | 12/2016 | Eledath | G06V 20/52 |
| | | | | 707/766 |

(Continued)

*Primary Examiner* — Motilewa Good-Johnson
(74) *Attorney, Agent, or Firm* — DORITY & MANNING P.A.

(57) ABSTRACT

Systems and methods for providing visual indications of generative model responses can include obtaining a user input and processing the user input with a generative model to generate a model-generated-response. The systems and methods can process the model-generated response and an image of an environment to generate an augmented image. The augmented image can include visual indicators of the model-generated response, which can include annotating the image based on detected features within the image. Generation of the augmented image can include object detection and annotation based on the content of the model-generated response.

20 Claims, 20 Drawing Sheets

(56) References Cited

U.S. PATENT DOCUMENTS

| | | | |
|---|---|---|---|
| 2017/0318407 A1 | 11/2017 | Meister et al. | |
| 2018/0189354 A1 | 7/2018 | Paine et al. | |
| 2018/0336009 A1 | 11/2018 | Yoganandan et al. | |
| 2018/0336414 A1 | 11/2018 | Badr et al. | |
| 2019/0102938 A1* | 4/2019 | Wang | G06T 17/05 |
| 2019/0244609 A1* | 8/2019 | Olabiyi | G06N 3/047 |
| 2020/0184217 A1* | 6/2020 | Faulkner | G06T 7/50 |
| 2020/0193976 A1 | 6/2020 | Cartwright et al. | |
| 2020/0202849 A1 | 6/2020 | Cartwright et al. | |
| 2020/0250433 A1 | 8/2020 | Nowak-Przygodzki et al. | |
| 2021/0019215 A1* | 1/2021 | Neeter | G06Q 10/06316 |
| 2021/0208741 A1* | 7/2021 | Yang | G06F 3/0482 |
| 2021/0312628 A1* | 10/2021 | Larlus-Larrondo | G06N 3/084 |
| 2021/0390745 A1* | 12/2021 | Rykhliuk | G06V 10/462 |
| 2022/0027626 A1* | 1/2022 | Kharbanda | G06F 16/953 |
| 2022/0207872 A1 | 6/2022 | Ren et al. | |
| 2022/0230401 A1* | 7/2022 | Singh | G06T 19/006 |
| 2022/0253715 A1* | 8/2022 | Ray | G06V 20/62 |
| 2022/0261599 A1* | 8/2022 | Kastaniotis | G06N 3/04 |
| 2022/0414137 A1* | 12/2022 | Sewak | G06F 16/313 |
| 2023/0153309 A1* | 5/2023 | Coble | G06F 16/24578 707/727 |
| 2023/0214422 A1* | 7/2023 | Kwatra | G06F 16/783 707/736 |
| 2023/0245651 A1* | 8/2023 | Wang | G06N 5/022 704/275 |
| 2023/0252768 A1* | 8/2023 | Agnihotram | G06V 10/761 382/190 |
| 2023/0351728 A1* | 11/2023 | Shu | G06N 3/0895 |
| 2023/0394855 A1* | 12/2023 | Xie | G06F 40/40 |
| 2024/0020336 A1* | 1/2024 | Li | G06F 16/735 |
| 2024/0062019 A1* | 2/2024 | Aberle | G06F 40/56 |
| 2024/0071010 A1* | 2/2024 | Brent | G06T 5/70 |

* cited by examiner

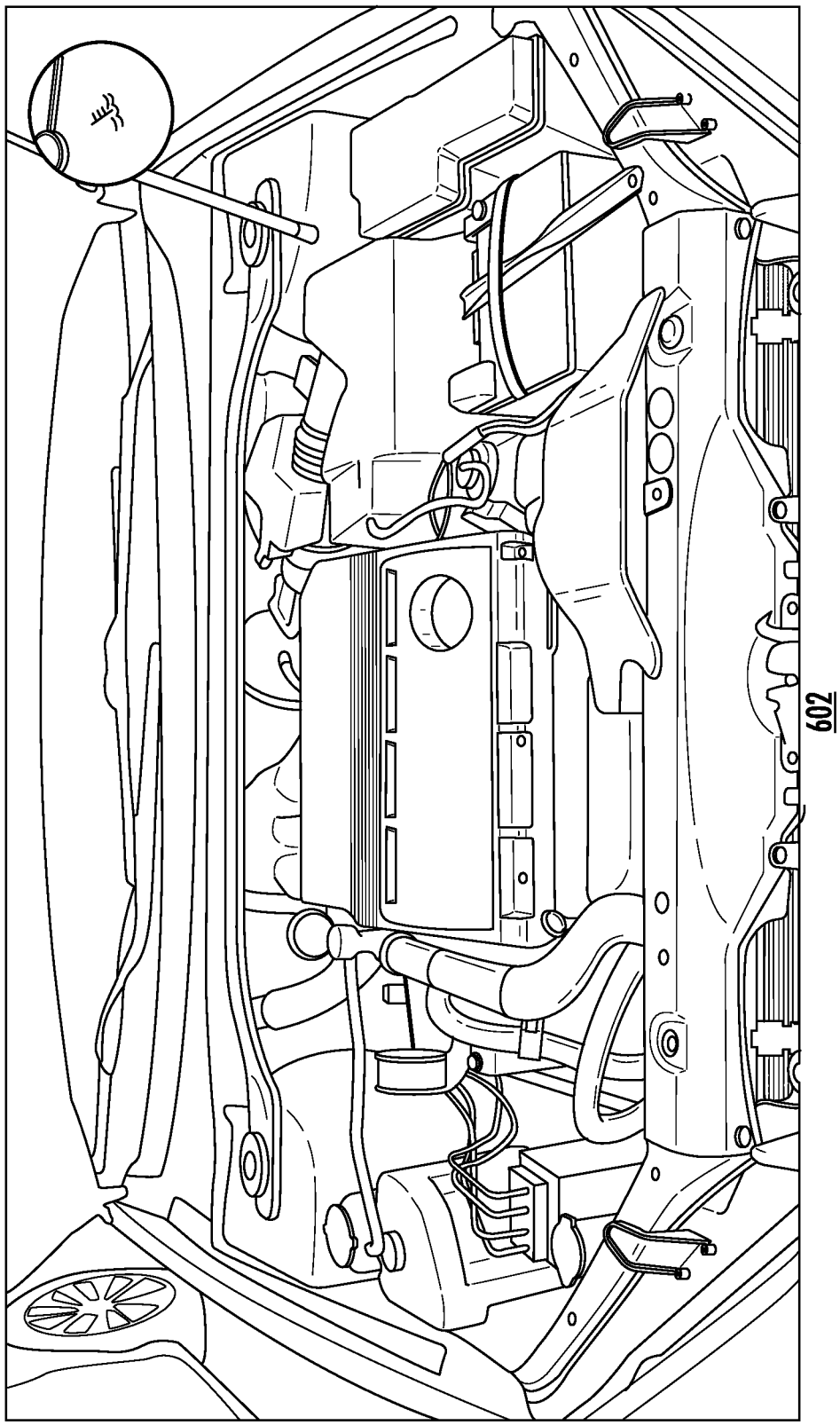

Which ones are impressionism?     904

Impressionism was a 19th century art movement characterized by:
- Small, visible brushstrokes that offer the bare impression of form
- Unblended color
- An emphasis on the accurate depiction of natural light
- Bright, vibrant colors

906

The following portions of your image could be considered impressionism:

908

Artwork
Portrait of Père Tanguy
Painting by Vincent van Gogh     910

Artwork
The Road
Painting by Ernest Lawson     912

Ask a follow up    What are the most liked     914

☐ Help me learn this  1010

This is a high school level geometry problem covering the side lengths in a triangle.

There are three questions which all refer to this same diagram:

1012

1014

Question 1  ⊕
(a) AC = 6, BC = 8, BD = 5  Find: AD

Question 2  ⊕
(b) AC = 10, BC = 4, BD = 8  Find: AD

Question 3  ⊕
(c) AC = 3, BC = (x-4), BD = x  Find: BC

1016

Ask a follow up    What are the most liked  1018

VISUAL INDICATORS OF GENERATIVE MODEL RESPONSE DETAILS

RELATED APPLICATIONS

The present application is based on and claims priority to U.S. Provisional Application No. 63/616,304 having a filing date of Dec. 29, 2023. Applicant claims priority to and the benefit of each of such application and incorporate all such application herein by reference in its entirety.

FIELD

The present disclosure relates generally to providing visual indicators of generative model responses. More particularly, the present disclosure relates to obtaining and processing a user input with a generative model to generate a model-generated response that can then be utilized to annotate image data to provide a generative model leveraged augmented-reality experience.

BACKGROUND

Understanding how to interact with an environment to perform particular actions can be difficult. For example, understanding how to fix a vehicle or use a machine may not be intuitive. Tutorials may provide insight on performing these actions; however, the tutorials may not be completely on topic and/or may be associated with a different context and/or a different model. Additionally, some tasks may not have a pre-existing tutorial. Moreover, tutorials may be hard to decipher with regards to how the actions apply to the user's environment.

Determining errors in an environment and figuring out how to correct the determined errors can be difficult. Additionally, if errors go undetected, the error can lead to a propagation of further errors, which lead to further confusion. The lack of real-time error detection can lead to a user spending time on a problem without understanding when and where they went wrong.

Additionally, some errors and/or problems may include a difficult and intricate response in order to resolve the problem or error. Such difficult and intricate responses may be prone to user confusion; therefore, further errors may be generated when attempting to resolve the errors.

SUMMARY

Aspects and advantages of embodiments of the present disclosure will be set forth in part in the following description, or can be learned from the description, or can be learned through practice of the embodiments.

One example aspect of the present disclosure is directed to a computing system for augmented-reality annotations. The system can include one or more processors and one or more non-transitory computer-readable media that collectively store instructions that, when executed by the one or more processors, cause the computing system to perform operations. The operations can include obtaining a user input. The user input can include a query associated with a user environment. The operations can include processing the user input with a generative model to generate a model-generated response. The generative model can include a machine-learned language model. In some implementations, the model-generated response can include a predicted response to the query. The model-generated response can be associated with an object. The operations can include obtaining image data descriptive of the user environment. The image data can depict at least a portion of the user environment. The operations can include processing the model-generated response and the image data with an image augmentation model to generate an augmented image. The augmented image can be descriptive of the user environment annotated based on the model-generated response. The image augmentation model can annotate the image data based on detecting the object in the image data. The operations can include providing the augmented image for display.

In some implementations, the operations can include obtaining additional image data descriptive of the user environment. The operations can include processing the additional image data and the model-generated response with the generative model to generate an updated model-generated response and processing the additional image data and the updated model-generated response with the image augmentation model to generate an updated augmented image. The updated augmented image can be descriptive of the user environment annotated based on the updated model-generated response. The operations can include providing the updated augmented image for display. The model-generated response can include a multi-part response. The multi-part response can be descriptive of a sequence of actions to perform to interact with the object in the user environment to perform an interaction associated with the query. In some implementations, the augmented image can be associated with providing first instructions associated with a first action of the sequence of actions. The updated augmented image can be associated with providing second instructions associated with a second action of the sequence of actions. Processing the additional image data and the updated model-generated response with the image augmentation model is performed in response to: determining, based on the additional image data, a first action is associated with a sequence of actions of the model-generated response was performed.

In some implementations, processing the model-generated response and the image data with the image augmentation model can include processing the model-generated response and the image data with the image augmentation model to generate a plurality of augmented images. The model-generated response can include a multi-part response. Each of the plurality of augmented images can be associated with a respective part of the multi-part response. The operations can include processing the model-generated response and the plurality of augmented images to generate a multimodal response output and providing the multimodal response output for display. In some implementations, the multimodal response output can include step-by-step instructions for performing a task. The plurality of augmented images can include annotations associated with actions to perform as part of the step-by-step instructions. The plurality of augmented images can be provided adjacent to text instructions.

In some implementations, the generative model can include a vision language model. The vision language model can include a text encoder, an image encoder, and a text decoder. The generative model can be communicatively connected with a search engine. The augmented image can be provided for display via an augmented-reality experience. The augmented image can include an annotation that indicates a position of the object within the image data. In some implementations, the annotation can include text data associated with the model-generated response.

Another example aspect of the present disclosure is directed to a computer-implemented method for providing a response in an augmented-reality experience. The method can include obtaining, by a computing system including one or more processors, multimodal data. The multimodal data can include a query associated with features in a user environment. In some implementations, the multimodal data can include an input image. The input image can depict at least a portion of the user environment. The method can include processing, by the computing system, the multimodal data with a generative model to generate a model-generated response. The generative model can include a machine-learned language model. The model-generated response can include a predicted response to the query. In some implementations, the model-generated response can be associated with an object. The method can include obtaining, by the computing system, image data descriptive of the user environment. The image data can depict at least a portion of the user environment. The method can include processing, by the computing system, the model-generated response and the image data with an image augmentation model to generate an augmented image. The augmented image can be descriptive of the user environment annotated based on the model-generated response. In some implementations, the image augmentation model can annotate the image data based on detecting the object in the image data. The method can include providing, by the computing system, the augmented image for display in the augmented-reality experience.

In some implementations, the query can include a request for information about the object in the user environment. The query can include a text string that indicates an object type of interest. The method can include processing, by the computing system, the input image and the query with a vision language model to generate an identification output. The identification output can be descriptive of an identifier of the object within the user environment. The method can include providing, by the computing system and before processing the multimodal data with the generative model, the identification output for display. The method can include processing, by the computing system, the input image and the identification output to generate an annotated input image. The annotated input image can include the input image with the identifier output overlayed over a portion of the input image. In some implementations, providing the identification output for display can include providing, by the computing system, the annotated input image for display.

In some implementations, the method can include processing, by the computing system, the input image with a detection model to generate a plurality of bounding boxes. The plurality of bounding boxes can be associated with a plurality of detected objects within the input image. The method can include generating, by the computing system, a plurality of image segments based on the plurality of bounding boxes. Each image segment of the plurality of image segments can be associated with a different detected object of the plurality of detected objects. At least a subset of the plurality of image segments can be processed with the generative model to generate the model-generated response. The method can include processing, by the computing system, the plurality of image segments with a classification model to generate a plurality of object classifications; determining, by the computing system, a particular object classification of the plurality of object classifications is associated with the object type of interest; and providing, by the computing system, the particular object classification for display.

Another example aspect of the present disclosure is directed to one or more non-transitory computer-readable media that collectively store instructions that, when executed by one or more computing devices, cause the one or more computing devices to perform operations. The operations can include obtaining multimodal data. The multimodal data can include a query associated with features in a user environment. The multimodal data can include an input image. The input image can depict at least a portion of the user environment. The operations can include processing the multimodal data with a generative model to generate a model-generated response. The generative model can include a machine-learned language model. The model-generated response can include a predicted response to the query. In some implementations, the model-generated response can be associated with a plurality of objects. The model-generated response can include a multi-part response. Different parts of the multi-part response can be associated with different objects of the plurality of objects. The operations can include obtaining image data descriptive of the user environment. The image data can depict at least a portion of the user environment. The operations can include processing the image data with a detection model to generate a first bounding box. The first bounding box can be descriptive of a position of a first object of the plurality of objects within the image data. The operations can include processing the model-generated response, the first bounding box, and the image data with an annotation model to generate a first augmented image. The first augmented image can depict the user environment annotated based on a first part of the model-generated response. In some implementations, the first augmented image can include a first annotation that indicates the position of the first object of the plurality of objects within the image data. The operations can include providing the first augmented image for display.

In some implementations, the operations can include processing the image data with the detection model to generate a second bounding box. The second bounding box can be descriptive of a position of a second object of the plurality of objects within the image data. The operations can include processing the model-generated response, the second bounding box, and the image data with an annotation model to generate a second augmented image. The second augmented image can depict the user environment annotated based on a second part of the model-generated response. The second augmented image can include a second annotation that indicates the position of the second object of the plurality of objects within the image data. The operations can include providing the second augmented image for display. In some implementations, the query can be associated with a request for instructions on how to interact with the plurality of objects within the user environment. The model-generated response can include a sequence of actions for performing interactions with the plurality of objects.

In some implementations, the query can be descriptive of a diagnostic request associated with a product. The model-generated response can include a plurality of actions for fixing the product. The first object can be associated with a first part of the product, and a second object can be associated with a second part of the product.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6A depicts an illustration of an example environment image according to example embodiments of the present disclosure.

FIG. 9B depicts an illustration of an example multimodal response associated with identifications according to example embodiments of the present disclosure.

Figure 1:
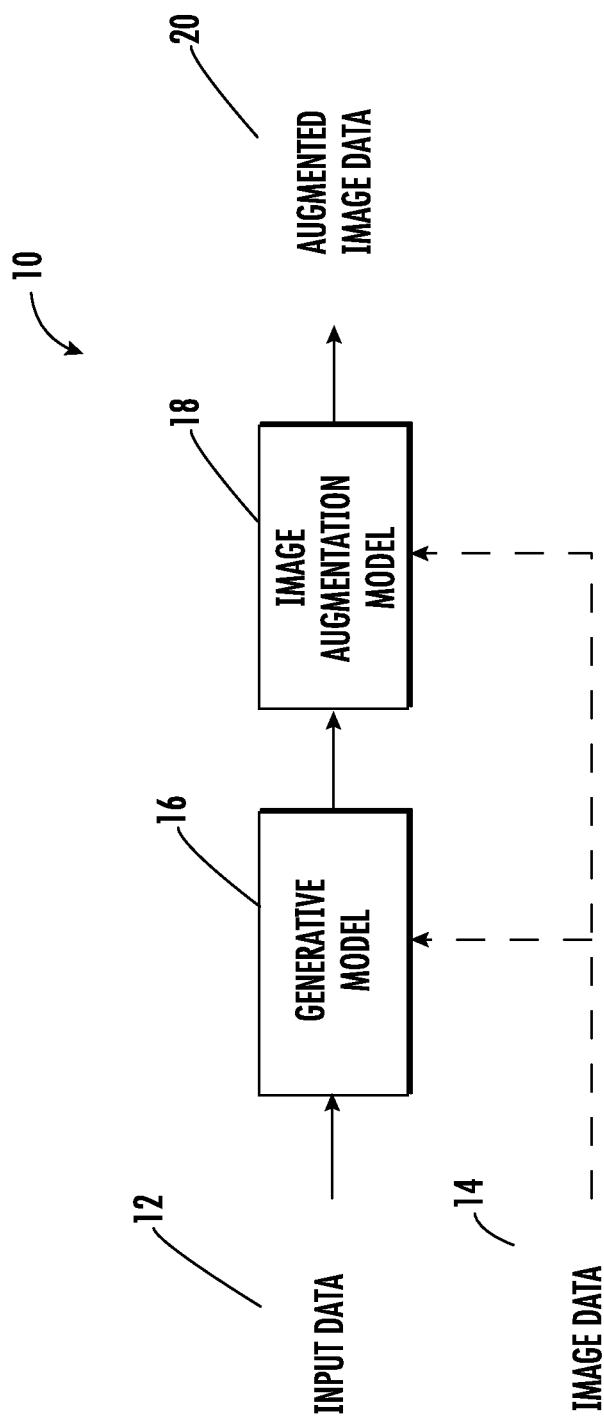
FIG. 1 depicts a block diagram of an example image augmentation system according to example embodiments of the present disclosure.

Reference numerals that are repeated across plural figures are intended to identify the same features in various implementations.

DETAILED DESCRIPTION

Generally, the present disclosure is directed to systems and methods for providing visual indicators of generative model responses. In particular, the systems and methods disclosed herein can leverage a generative model and image augmentation to provide visual indicators of a generative model response, which can provide detailed and directed feedback to a user. For example, a user may have a question associated with one or more objects within the environment. The question may be associated with how to use a product, how to fix a product, how to take care of a plant, and/or other interactions with an environment. The user may provide a user input and an input image to the system to receive visual indicators. In particular, the systems and methods may obtain a user input and/or an input image. The user input can be descriptive of a user query. The input image may be associated with a user environment (e.g., an image of what the user is looking at). The user input and/or the input image can be processed with a generative model (e.g., a large language model, a vision language model, and/or other generative models) to generate a model-generated response. The model-generated response can include a response to the user query and may include predicted data. The model-generated response and image data associated with the user environment can then be processed with an image augmentation model to generate one or more augmented images that provides visual indicators of the model-generated response based on annotating the image data. The one or more augmented images can then be provided to the user.

The systems and methods for providing visual indicators of generative model responses can provide users with direct and detailed indications of what features in an environment are relevant to the response to the provided query. In some implementations, the systems and methods can provide details on how to interact with the environment to perform particular tasks. For multi-step tasks, the systems and methods may generate a model-generated response that can include a multi-part response. The multi-part response may be leveraged to generate a plurality of different augmented images associated with the plurality of different parts of the multi-part response. For example, starting a lawn mower, fixing a bike, changing the spark plugs in a car, baking lasagna, and/or other tasks may be reliant on a sequence of actions to be performed to perform a given task. The systems and methods can include providing visual indicators in stages associated with the different parts of the multi-part response and may provide a next stage of visual indicators once the system determines a particular action has been performed, which may include continually processing image data to determine one or more actions associated with a particular part of the multi-part response has been performed before providing the next visual indicators.

The systems and methods can leverage search engines, rendering engines, detection models, segmentations models, classification models, and/or other models in addition to the generative model to identify features within the image data. The identified features may be cross-referenced against the model-generated response to determine which features are relevant. The relevant features may then be annotated. Alternatively and/or additionally, the other machine-learned models may be obtained and/or conditioned based on the model-generated response. For example, a particular detection model may be obtained based on the model-generated response. The particular detection model may be trained, configured, and/or tuned to detect a particular object associated with the model-generated response (e.g., trained to detect an oil filter based on the model-generated response having a step for removing the oil filter). In some implementations, the generative model and/or the image augmentation model may be communicatively connected to perform data retrieval, object classification, and/or other tasks.

Visual indicators of generative model responses can provide a user with a direct and detailed response that may include a multimodal output with text superimposed over and/or provided with images. In particular, a generative model response (e.g., an LLM response) may be provided for display in an augmented-reality interface that may include rendering indicators that provide a visual indication of what one or more portions of the model-generated response is directed to. In some implementations, the visual indicators may include highlighting a particular object within an image that is relevant to the model-generated response and/or may include a diagram and/or animation for how to interact with the object.

Understanding how to interact with an environment to perform particular actions (e.g., do-it-yourself projects, fixing objects, cooking, etc.) can be difficult. Generative models (e.g., LLMs) can generate responses to user prompts or queries; however, understanding a natural language response can be difficult, especially when terms may not be understood by the user (e.g., a user may not know what a chassis is for auto repair or what a mandolin slicer is for cooking).

Image(s) of an environment and/or a query may be processed with a generative model to generate a response to the query. The image(s) and the model-generated response can then be processed to generate annotated images (and/or AR renderings) that indicate portions of the image(s) that are associated with the model-generated response. The model-generated response can include instructions for performing a sequence of actions. The augmented-reality experience can include providing visual indicators in stages based on a sequence of actions associated with the instructions.

Visual indicators associated with generative model responses can be leveraged as augmented-reality rendering assets to provide an intuitive and immersive experience for understanding an environment and/or performing projects. Moreover, the image annotation system may include segmenting the model-generated response into parts that may be leveraged to generate a multimodal response that can include images and text formatted in parts associated with instructions for performing actions.

The visual indicators associated with the generative model response can include details associated with the generative model response. The details can include an indication of an object and/or region of the image that is relevant to the generative model response. Additionally and/or alternatively, the details can include additional details associated with an object in an image in which the additional details are associated with the generative model response. The details may include indicators of actions that can be performed and are associated with the generative model response.

The systems and methods of the present disclosure provide a number of technical effects and benefits. As one example, the system and methods can provide an augmented-reality experience that annotates an environment based on a generative model response. In particular, the systems and methods disclosed herein can leverage multi-modal processing, generative model processing, object detection, image augmentation, and/or augmented-reality rendering to provide an interactive experience for generating and providing model-generated responses. Input data can be obtained and processed with a generative model to generate a model-generated response. Image data can then be obtained and processed with an image augmentation model to generate an augmented image that annotates the image based on the model-generated response, which can then be provided for display.

Another technical benefit of the systems and methods of the present disclosure is the ability to leverage one or more machine-learned models to understand an environment and provide a model-generated response that is responsive to a user query. For example, the systems and methods can obtain and/or determine a query, can process the query and/or image data with a generative model to generate a model-generated response that is responsive to the query, can then obtain one or more images, can process the one or more images and the model-generated response to generate one or more augmented images that annotate the one or more images based on the model-generated response, and can continually collect data to update the annotations, which may include adjusting the substance of the annotations based on a determined action.

Another example of technical effect and benefit relates to improved computational efficiency and improvements in the functioning of a computing system. For example, the systems and methods disclosed herein can leverage the storage of the determined prompt and multi-part response to continually compare the additionally obtained data against the multi-part response without having to continually redetermine the semantics of the environment for a state change.

With reference now to the Figures, example embodiments of the present disclosure will be discussed in further detail.

FIG. 1 depicts a block diagram of an example image augmentation system 10 according to example embodiments of the present disclosure. In some implementations, the image augmentation system 10 is configured to receive, and/or obtain, a set of input data 12 descriptive of a query (and/or prompt) and, as a result of receipt of the input data 12, generate, determine, and/or provide augmented image data 20 that includes visual indicators of generative model response details. Thus, in some implementations, the image augmentation system 10 can include a generative model 16 that is operable to process a query (and/or prompt) and generate a predicted response for the query (and/or prompt).

In particular, the image augmentation system 10 can be configured to leverage a generative model 16 and/or an image augmentation model 18 to obtain input data 12 including a query and output augmented image data 20 that includes visual indicators of generative model response details. For example, the image augmentation system 10 can obtain input data 12 and/or image data 14. The input data 12 can include a user input that includes a request for information associated with one or more features in a user environment. The input data 12 can include text data, audio data, gesture data, motion data, image data, latent encoding data, multimodal data, and/or other data. The input data 12 may include a text string descriptive of a question and/or command associated with a topic. The input data 12 may be obtained with a mobile computing device (e.g., a smartphone, a smart watch, smart glasses, a table, a virtual assistant device, etc.) and/or another computing device. The image data 14 may be obtained in response to the input data 12, may be simultaneously obtained with the input data 12, may be obtained before obtaining the input data 12, and/or may be continually obtained before, during, and/or after obtaining the input data 12. The image data 14 can be descriptive of an environment (e.g., a user environment). The image data 14 can include a plurality of images and may be associated with a live camera feed. The image data 14 can include one or more images that depict one or more objects associated with a topic of a query associated with the input data 12. The image data 14 may be obtained via image sensors of a mobile computing device, may be obtained from local storage on a mobile computing device, may be obtained from a server computing system, may be obtained from a web resource, and/or may be obtained from other sources.

The image augmentation system 10 can process the input data 12 and/or the image data 14 with a generative model 16 to generate a model-generated response. The generative model 16 can include a generative language model, which may include a large language model (e.g., an autoregressive language model), a vision language model, and/or other generative language models. The generative model 16 can be trained, configured, and/or tuned to generate a predicted response to an obtained input, in which the predicted response may include a plurality of predicted features based on a plurality of probabilities associated with learned sequences. The generative model 16 may include text encoders, image encoders, other data encoders, and/or one or more decoders, which may decode one or more feature representations into text data, image data, audio data, latent encoding data, multimodal data, and/or other data. The model-generated response can include text data, image data, audio data, latent encoding data, multimodal data, and/or other data. The model-generated response can be responsive to a query of the input data and may be conditioned based on the image data 14. The model-generated response can include details associated with one or more topics and/or one or more sub-topics associated with the input data 12.

The image augmentation model 18 can process the model-generated response and the image data 14 (and/or second image data) to generate augmented image data 20. The image augmentation model 18 can include one or more machine-learned models, which may include a detection model, a segmentation model, a classification model, an annotation model, an augmentation model, and/or other models. For example, the detection model may detect one or more objects within the image data 14 and/or may generate one or more bounding boxes associated with the position of the one or more objects within the image data 14. The one or more bounding boxes may be leveraged for placement of the one or more visual indicators to generate the augmented image data 20. Additionally and/or alternatively, the one or more objects within the image data 14 may be identified by processing the image data 14 with one or more classification models to generate one or more classification labels associated with the one or more objects. The classification labels and the model-generated response may be processed (e.g., with a generative language model) to determine which and/or whether one or more respective objects within the image data are relevant to the model-generated response, which may be utilized to determine how to annotate the image data 14 (e.g., which objects to indicate as being relevant to the model-generated response). In some implementations, the regions of the image data 14 associated with the one or more bounding boxes may be segmented and processed with the classification model. The classification labels, the bounding boxes, the image data 14, and/or the model-generated response may be processed with an annotation model and/or an augmentation model to generate the augmented image data 20.

Alternatively and/or additionally, the model-generated response and/or the image data 14 may be processed with a vision language model (and/or another generative model (e.g., an image generation model)) to generate a model output descriptive of a portion of the image data 14 that is relevant to the model-generated response. The model output can then be leveraged to determine where and/or how to annotate the image data 14 to generate the augmented image data 20.

The augmented image data 20 can be descriptive of the image data 14 augmented to annotate the image(s) with visual indicators of details associated with the model-generated response. The visual indicators may include a text overlay, inline text, pop-up user interface elements, object highlighting, image tinting, diagram(s), animation(s), a generated image time lapse for performing an action (e.g., generating a plurality of model-generated images (e.g., with a text-to-image generation model) that can then be blended with the image data 14 to provide an AR tutorial for performing the action and/or a task), selectable user interface elements, and/or other visual indicators. The augmented image data 20 may include a hybrid of ground truth image data and novel predicted pixel data that was generated by processing the model-generated response with an image generation model. In some implementations, the augmented image data 20 may be provided as part of an augmented-reality experience. Alternatively and/or additionally, the augmented image data 20 may include a plurality of augmented images that may be provided with model-generated text data. The model-generated text data may be associated with the model-generated response.

Figure 2:
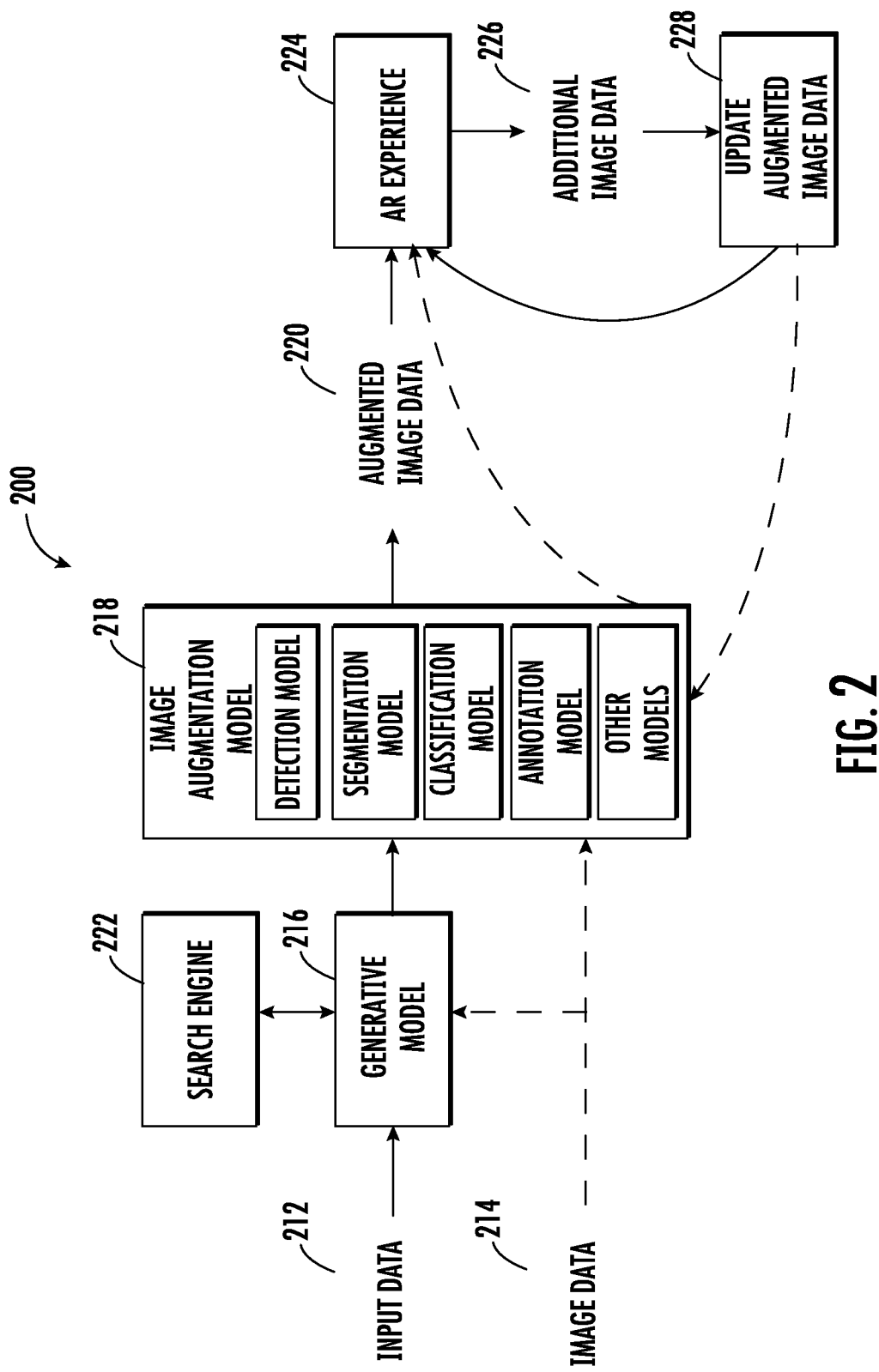
FIG. 2 depicts a block diagram of an example augmented-reality system according to example embodiments of the present disclosure.

FIG. 2 depicts a block diagram of an example augmented-reality system 200 according to example embodiments of the present disclosure. The augmented-reality system 200 is similar to image augmentation system 10 of FIG. 1 except that the augmented-reality system 200 further includes an augmented-reality experience 224 for displaying the visual indicators.

In particular, the augmented-reality system 200 can be configured to leverage a generative model 216 and/or an image augmentation model 18 to obtain a query and output an augmented-reality experience that includes visual indicators of generative model response details. For example, the augmented-reality system 200 can obtain input data 212 and/or image data 214. The input data 212 can include a user input that includes a request for information associated with one or more features in a user environment, which may include a request for step-by-step instructions for performing a task (e.g., a task that is reliant on a sequence of actions). The input data 212 can include text data (e.g., a text string), audio data (e.g., a voice command), gesture data (e.g., a touch gesture, an IMU-based gesture, etc.), motion data (e.g., a shake of a mobile computing device), image data (e.g., an input image), latent encoding data, multimodal data (e.g., text and audio, text and image, image and audio, etc.), and/or other data. The input data 212 may include a text string descriptive of a question (e.g., "How do I fix this?", "Which one is out of place?", and/or "Which is the best path forward for reaching the center of the park?") and/or command associated with a topic (e.g., "tell me more about the monument," "give me a recipe for a pasta dish with these ingredients," and/or "generate a tutorial for building a camping shelter"). The input data 212 may be obtained with a mobile computing device (e.g., a smartphone, a smart watch, smart glasses, a table, a virtual assistant device, etc.) and/or another computing device.

The image data 214 may be obtained in response to obtaining and/or processing the input data 212. For example, the image data 214 may be obtained in response to the input data 212 being obtained, in response to a model-generated response being generated, and/or in response to an augmented-reality experience being opened. In some implementations, the image data 214 may be simultaneously obtained with the input data 212. For example, the image data 214 may be an extension of the input data 212 that may be obtained in response to invoking a particular application (e.g., an AR application, a virtual assistant application, a search application, and/or another application). Alternatively and/or additionally, the image data 214 may be obtained before obtaining the input data 212. For example, the user may capture an image of an environment (e.g., taking a picture with a camera application of a mobile computing device), and the user can then provide input data 212 to be processed with the image data 214 (e.g., generating a multimodal query and/or prompt). In some implementations, the image data 214 may be continually obtained before, during, and/or after obtaining the input data 212. For example, the image data 214 may be continually generated and/or obtained as part of a viewfinder application, augmented-reality application, and/or other application being invoked. Alternatively and/or additionally, the image data 214 may be continually generated and/or obtained as part of an always on image capture. In some implementations, the image data 214 may be temporarily stored on a rolling basis (e.g., stored for 15-30 seconds then deleted in view of new image data). In some implementations, the image data 214 may be uploaded and/or selected for input. The image data 214 can be descriptive of user-captured photos, one or more images copied and/or downloaded from the internet, images from local storage, screenshots, model-generated images, paintings, and/or other images. The image data 214 may be descriptive of a variety of different environments, which may include a user environment, a virtual environment, a painted environment, a rendered environment, other environments not associated with the user, etc.

The image data 214 can be descriptive of an environment (e.g., a user environment). The environment may include a plurality of features that may be descriptive of a plurality of objects and/or other environment features. The environment may include a room, a park, a city block, a trail, a garden, a garage, and/or other environments. The image data 214 can include a plurality of images and may be associated with a live camera feed. The image data 214 can include one or more images that depict one or more objects (e.g., a bike, a wrench, a screwdriver, a wheel tube, a spare chain, noodles, a ladle, a sauce can, a stove, etc.) associated with a topic of a query (e.g., fixing a bike or cooking carbonara) associated with the input data 212.

The augmented-reality system 200 can process the input data 212 and/or the image data 214 with a generative model 216 to generate a model-generated response. The generative model 216 can include a generative language model, which may include a large language model (e.g., an autoregressive language model), a vision language model, and/or other generative language models. In some implementations, the generative model 216 may include an image generation model (e.g., a diffusion model). The generative model 216 can be trained, configured, and/or tuned to generate a predicted response to an obtained input, in which the predicted response may include a plurality of predicted features based on a plurality of probabilities associated with learned sequences. For example, the generative model 216 may include billions of parameters trained on a plurality of content items to learn a plurality of sequence representations that may be leveraged for novel data generation. The generative model 216 may include text encoders, image encoders, other data encoders, and/or one or more decoders, which may decode one or more feature representations into text data, image data, audio data, latent encoding data, multimodal data, and/or other data.

In some implementations, the generative model 216 may be communicatively connected with one or more machine-learned models (e.g., a classification model, a detection model, a segmentation model, a sentiment analysis model, a semantic understanding model, etc.) and/or one or more engines (e.g., a search engine, a computation engine, and/or a rendering engine). For example, the generative model 216 may be configured, conditioned, trained, and/or tuned to generate model-generated queries based on the input data 212 and/or the image data 214 that can then be transmitted to a search engine 222. The search engine 222 may process the model-generated query to determine one or more search results that can then be transmitted back to the generative model 216. The generative model 216 can then leverage the information from the one or more search results to generate the model-generated response, which may include summarizing, rewording, and/or distilling the information from the one or more search results. In some implementations, the generative model 216 may be configured, trained, and/or tuned to generate an application programming interface (e.g., and/or generate an application programming interface call) to interface with the search engine 222 and/or other platforms (or applications).

The model-generated response can include text data (e.g., a natural language response (e.g., a conversational response, a topic summary, text instructions, a story, a poem, etc.)), image data (e.g., model-generated images that outline a response to the query), audio data (e.g., a plurality of audio signals that may include audio instructions, a song, a conversational audio response, etc.), latent encoding data (e.g., an embedding and/or other encoding representations), multimodal data (e.g., a response with text and images, a plurality of images with an audio narration, etc.), and/or other data. The model-generated response can be responsive to a query of the input data (e.g., an answer to a question and/or data that fulfills a command) and may be conditioned based on the image data 214. The model-generated response can include details associated with one or more topics (e.g., instructions on how to change a tire on a particular bike depicted in the image, a pasta recipe based on the ingredients in the image, an answer to what objects can be utilized for building shelters in a deciduous forest, etc.) and/or one or more sub-topics associated with the input data 212 (e.g., the model-generated response may include a plurality of candidate options for performing a given task and/or for responding to the question and/or command).

The image augmentation model 218 can process the model-generated response and the image data 214 (and/or second image data) to generate augmented image data 220. The image augmentation model 218 can include one or more machine-learned models, which may include a detection model, a segmentation model, a classification model, an annotation model, an augmentation model, and/or other models. The one or more machine-learned models may be obtained based on the model-generated response. For example, a particular machine-learned model may be obtained based on the model-generated response (e.g., based on a topic of the model-generated response and/or based on an API call included in the model-generated response). In some implementations, a particular type of model (e.g., a detection model, a segmentation model, a classification model, an annotation model, an augmentation model, and/or other models) may be obtained based on the model-generated response. In some implementations, a specialized machine-learned model (e.g., a detection model specifically trained to detect bikes, a classification model trained to classify specific types of trees, a segmentation model specifically trained to generate segmentation masks for building segmentation, etc.) may be obtained, trained, and/or configured based on the model-generated response. Alternatively and/or additionally, the one or more machine-learned models may be conditioned based on the model-generated response (e.g., the detection model may process the model-generated response and the image data 214 to condition the detection model to only provide bounding boxes for recognized objects associated with features of the model-generated response).

The detection model may detect a plurality of objects within the image data 214 and/or may generate a plurality of bounding boxes associated with the position of the plurality of objects within the image data 14. The plurality of bounding boxes may be leveraged for placement of the one or more visual indicators to generate the augmented image data 220. Additionally and/or alternatively, the plurality of objects within the image data 214 may be identified by processing the image data 214 with one or more classification models to generate a plurality of classification labels associated with the plurality of objects. The classification labels and the model-generated response may be processed (e.g., with a generative language model) to determine which and/or whether one or more respective objects within the image data are relevant to the model-generated response, which may be utilized to determine how to annotate the image data 214 (e.g., which objects to indicate as being relevant to the model-generated response). In some implementations, the regions of the image data 214 associated with the plurality of bounding boxes may be segmented and processed with the classification model. The classification labels, the bounding boxes, the image data 14, and/or the model-generated response may be processed with an annotation model and/or an augmentation model to generate the augmented image data 220.

In some implementations, the image data 214 and/or the model-generated response may be processed with one or more segmentation models to generate one or more segmentation masks associated with one or more objects within the image data 214 that are determined to be relevant to the model-generated response. The one or more segmentation masks may be utilized to highlight the relevant objects within the image data to generate the augmented image data 220. Alternatively and/or additionally, the objects may be segmented for novel image generation, pixel replacement, object augmentation, scene tinting, image recoloring, and/or other augmentations.

Alternatively and/or additionally, the model-generated response and/or the image data 214 may be processed with a vision language model (and/or another generative model (e.g., an image generation model)) to generate a model output descriptive of a portion of the image data 214 that is relevant to the model-generated response. The model output can then be leveraged to determine where and/or how to annotate the image data 214 to generate the augmented image data 220.

The augmented image data 220 can be descriptive of the image data 214 augmented to annotate the image(s) with visual indicators of details associated with the model-generated response. The visual indicators may include a text overlay, inline text, pop-up user interface elements, object highlighting, image tinting, diagram(s), animation(s), a generated image time lapse for performing an action (e.g., generating a plurality of model-generated images (e.g., with a text-to-image generation model) that can then be blended with the image data 214 to provide an AR tutorial for performing the action), selectable user interface elements, and/or other visual indicators. The augmented image data 220 may include a hybrid of ground truth image data and novel predicted pixel data that was generated by processing the model-generated response with an image generation model. The augmented image data 220 may be provided as part of an augmented-reality experience 224. Alternatively and/or additionally, the augmented image data 220 may include a plurality of augmented images that may be provided with model-generated text data. The model-generated text data may be associated with the model-generated response.

In some implementations, the augmented-reality experience 224 may include updating the visual indicators based on an environment change, a state change, and/or a perspective change. For example, the augmented-reality system 200 may obtain additional image data 226. The additional image data 226 may be descriptive of the environment at a second time after the first time associated with the image data 214. The additional image data 226 may be processed to determine a change has occurred. Based on the determined change, the augmented-reality system 200 may update the augmented image data 228, which can include adjusting the current visual indicators and/or providing a second set of visual indicators.

For example, the model-generated response may include a multi-part response associated with a sequence of actions for performing a task. The augmented image data 220 may include a first set of visual indicators associated with performing a first action of the sequence of actions. The augmented-reality system 200 can determine, based on the additional image data 226, that the first action has been performed. The image augmentation model may generate second augmented image data that includes a second set of visual indicators associated with a second action of the sequence of actions. The second augmented image data can then be provided via the augmented-reality experience 224.

Alternatively and/or additionally, the visual indicator(s) may be updated based on determining a set amount of time has elapsed, based on determining an incorrect action has been performed, and/or based on determining other changes have occurred.

Figure 3:
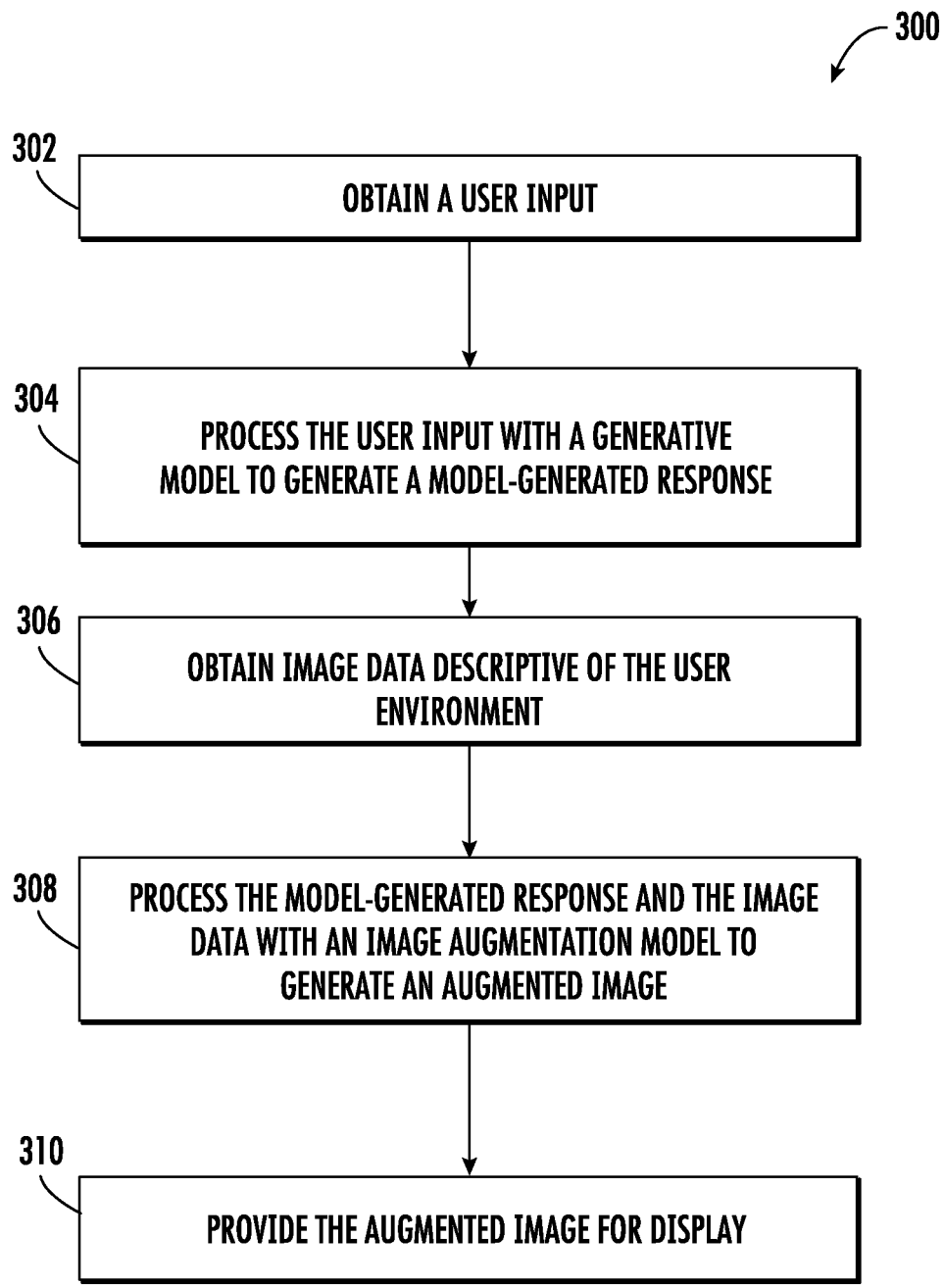
FIG. 3 depicts a flow chart diagram of an example method to perform generative model response generation according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain a user input. The user input can include a query associated with a user environment. The user input can include a text input (e.g., a text string obtained via a keyboard (e.g., a graphical keyboard, a conductive keyboard, and/or a mechanical keyboard)), an audio input (e.g., a voice command obtained via an audio sensor (e.g., a microphone)), an image input (e.g., an image generated with an image sensor (e.g., a camera and/or and infrared sensor)), a gesture input (e.g., a gesture obtained via a touch sensor, a motion sensor, and/or an image sensor), a multimodal input, and/or other inputs. The user input may be associated with a particular object and/or a set of particular objects within the user environment. Alternatively and/or additionally, the user input can include a query associated with one or more input images. The one or more input images may depict an environment, which may be a user environment and/or other environment. The one or more input images may depict a painting and/or a rendering.

At 304, the computing system can process the user input with a generative model to generate a model-generated response. The generative model can include a machine-learned language model (e.g., an autoregressive language model). The model-generated response can include a predicted response to the query. In some implementations, the model-generated response can be associated with an object. The generative model can include a vision language model. The vision language model can include a text encoder, an image encoder, and a text decoder. In some implementations, the generative model can be communicatively connected with a search engine. For example, the generative model may be configured, trained, and/or tuned to generate application programming interface (API) calls that can facilitate provide a model-generated query to the search engine and receive back one or more search results, which may include web resources, images, text, videos, audio files, documents, statistics, graphical representations, rendering assets, latent encodings, multimodal content items, and/or other content items. In some implementations, the generative model may include a router model that can be configured, trained, and/or tuned to process a user input, determine a relevant processing system and/or model to utilize, and then interact with the determined processing system and/or model to perform user input processing with the particular processing system and/or model.

At 306, the computing system can obtain image data descriptive of the user environment. The image data can depict at least a portion of the user environment. The image data may be obtained with a mobile computing device associated with a particular user. The mobile computing device may be the computing device that obtained the user input. In some implementations, the user input and/or the image data may be obtained from the mobile computing device with a server computing system. The image data may depict a plurality of objects within the user environment. In some implementations, the image data may include a plurality of features associated with individuals, structures, locations, products, and/or other environment features. The image data may include one or more images input by the user, which may include user-captured images, images from the web, locally-stored images, and/or other images.

At 308, the computing system can process the model-generated response and the image data with an image augmentation model to generate an augmented image. The augmented image can be descriptive of the user environment annotated based on the model-generated response. The image augmentation model can annotate the image data based on detecting the object in the image data. The image augmentation model may include one or more machine-learned models. For example, the image augmentation model may include a detection model, a segmentation model, a classification model, a generative model, and/or one or more other machine-learned models. The annotations can include text overlayed over a portion of the image. The annotations may include graphical representations. In some implementations, the annotations can include multimodal data, which may include text, image (e.g., an image overlay), audio, and/or other data. The annotations may include selectable user interface elements that may be selectable to provide additional information for display. The additional information can include a content item provided by a web resource, text generated with a generative model and/or obtained from one or more resources, a video (e.g., a video for performing a relevant action), audio (e.g., audio that includes instructions for interacting with the environment), and/or other data.

In some implementations, processing the model-generated response and the image data with the image augmentation model can include processing the model-generated response and the image data with the image augmentation model to generate a plurality of augmented images. The model-generated response can include a multi-part response. The multi-part response can be associated with a sequence of actions to perform to interact with features within the user environment (e.g., fixing a bike, using a blender, solving a puzzle, beating a game, and/or eating etiquette). In some implementations, each of the plurality of augmented images can be associated with a respective part of the multi-part response. The computing system can process the model-generated response and the plurality of augmented images to generate a multimodal response output and provide the multimodal response output for display. The multimodal response output can include step-by-step instructions for performing a task. The plurality of augmented images can include annotations associated with actions to perform as part of the step-by-step instructions. In some implementations, the plurality of augmented images can be provided adjacent to text instructions. The plurality of augmented images may be generated with a generative image generation model, and the text instructions may be generated with a generative language model (e.g., a large language model, which may include an autoregressive language model).

At 310, the computing system can provide the augmented image for display. The augmented image can be provided for display via an augmented reality experience and/or a virtual-reality experience. For example, the computing system may generate a rendering asset (e.g., an AR rendering asset and/or a VR rendering asset) based on the model-generated response, and the rendering asset may be utilized to generate the augmented image. The augmented image can include an annotation that indicates a position of the object within the image data. The annotation can include text data associated with the model-generated response. The annotation may include a diagram, a filter (e.g., halo filter that highlights an object and/or adds a tint over the regions of the image that do not include the object), an animation, and/or other graphical elements. The augmented image may be provided for display via the mobile computing device associated with the user.

In some implementations, the computing system can obtain additional image data descriptive of the user environment, process the additional image data and the model-generated response with the generative model to generate an updated model-generated response, and process the additional image data and the updated model-generated response with the image augmentation model to generate an updated augmented image. The updated augmented image can be descriptive of the user environment annotated based on the updated model-generated response. The computing system can provide the updated augmented image for display. The model-generated response can include a multi-part response. In some implementations, the multi-part response can be descriptive of a sequence of actions to perform to interact with the object in the user environment to perform an interaction associated with the query. The augmented image can be associated with providing first instructions associated with a first action of the sequence of actions. In some implementations, the updated augmented image can be associated with providing second instructions associated with a second action of the sequence of actions. Processing the additional image data and the updated model-generated response with the image augmentation model can be performed in response to determining, based on the additional image data, a first action is associated with a sequence of actions of the model-generated response was performed. For example, the additional image data may be processed to determine a particular feature from the image data is moved, replaced, and/or augmented (e.g., an oil cap has been removed, the bicycle wheel has been removed, the fork has been placed on the right side of the plate, the correct application has been opened, etc.).

Figure 4:
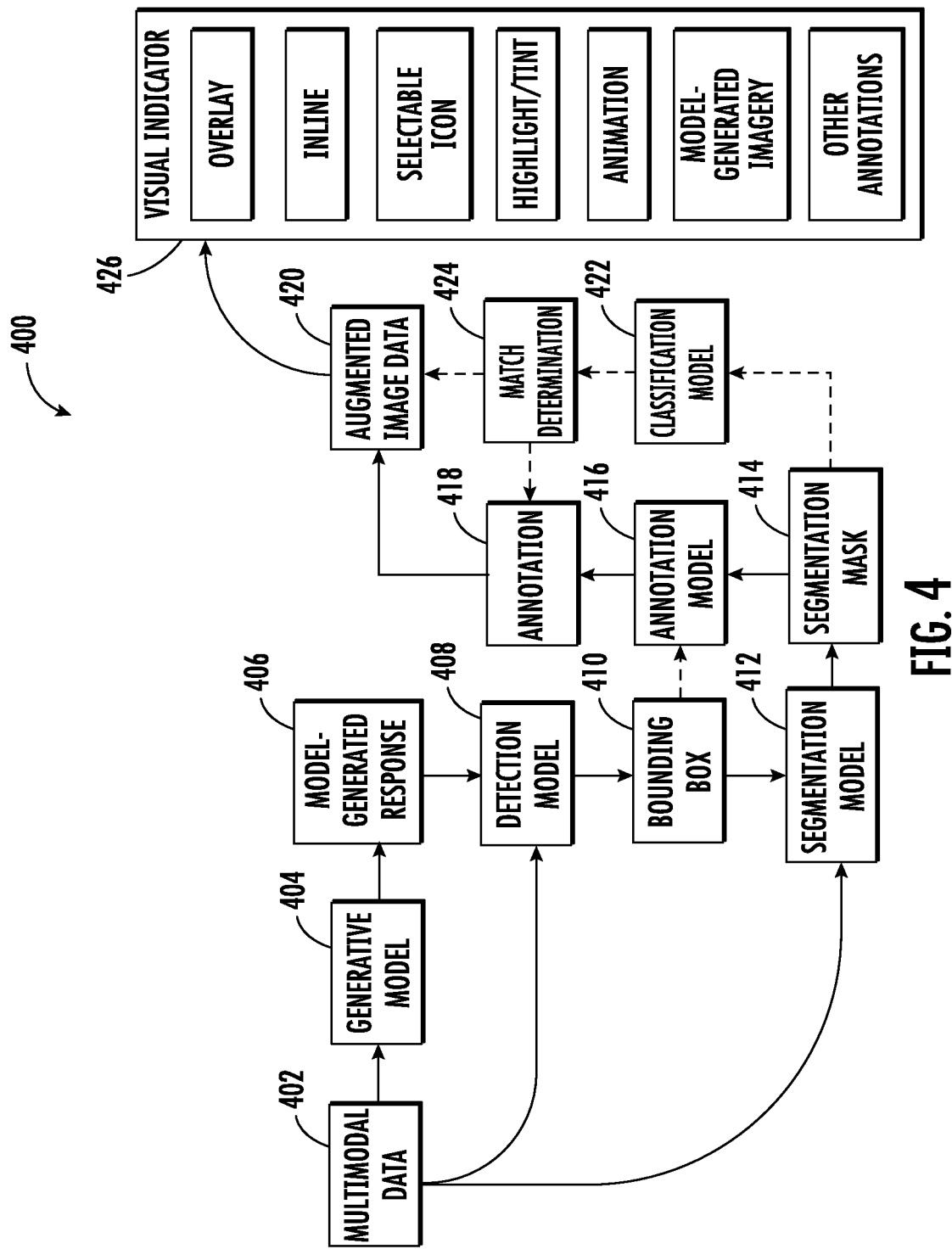
FIG. 4 depicts a block diagram of an example visual indicator system according to example embodiments of the present disclosure.

FIG. 4 depicts a block diagram of an example visual indicator system 400 according to example embodiments of the present disclosure. In particular, the visual indicator system 400 can include obtaining multimodal data 402 (e.g., text data and image data) and generating augmented image data 420 that includes one or more visual indicators 426 of details associated with a model-generated response 406.

For example, the visual indicator system 400 can obtain multimodal data 402. The multimodal data can include image data descriptive of an environment and user input data associated with a query (and/or a prompt). The multimodal data 402 can be processed with a generative model 404 (e.g., a large language model, a vision language model, and/or other generative model) to generate a model-generated response 406. The model-generated response can be responsive to the query (and/or prompt).

The model-generated response 406 and the image data of the multimodal data and/or other image data may then be processed with one or more machine-learned models to generate augmented image data 420 that includes visual indicator(s) 426 associated with details of the model-generated response 406.

For example, the model-generated response 406 and the image data can be processed with a detection model 408 to generate one or more bounding boxes 410 that may be processed with an annotation model 416 to determine where and/or how to annotate the image data to generate the augmented image data 420. Additionally and/or alternatively, the model-generated response 406, the image data, and/or the one or more bounding boxes 410 may be processed with a segmentation model 412 to generate one or more segmentation masks 414 associated with one or more objects in the image data. The one or more segmentation masks 414 may be processed with the annotation model 416 to provide more fine-grained detail for annotating the image data.

In some implementations, segmented image data may be processed with a classification model 422 to generate one or more classification labels. The one or more classification labels and the model-generated response may be processed with a match determination block 424 to determine if and/or what objects in the image data are relevant to the model-generated response 406. The output of the match determination block 424 may be leveraged for determining the annotations 418 for the augmented image data 420.

The annotation model 416 can leverage the model output(s) to generate and/or configure annotations 418 that may provide visual indicators 426 of the model-generated response 406. The annotations 418 may annotate the image data and may be leveraged to generate the augmented image data 420.

The visual indicator(s) 426 can include data overlays (e.g., text and/or image overlays), inline data (e.g., text provided inline with other text, diagrams provided inline with other diagrams or characters, etc.), selectable icons (e.g., a selectable user interface element that may be selected to invoke an action, which may include providing additional information), highlights and/or tinting (e.g., highlighting a relevant object), animations (e.g., animating an action to perform and/or an animation indicating a sequence of movements), model-generated imagery (e.g., predicted pixels may be generated based on the model-generated response 406, which may be blended with the image data and/or may be utilized to replace pixels in the image data), and/or other annotations.

Figure 5:
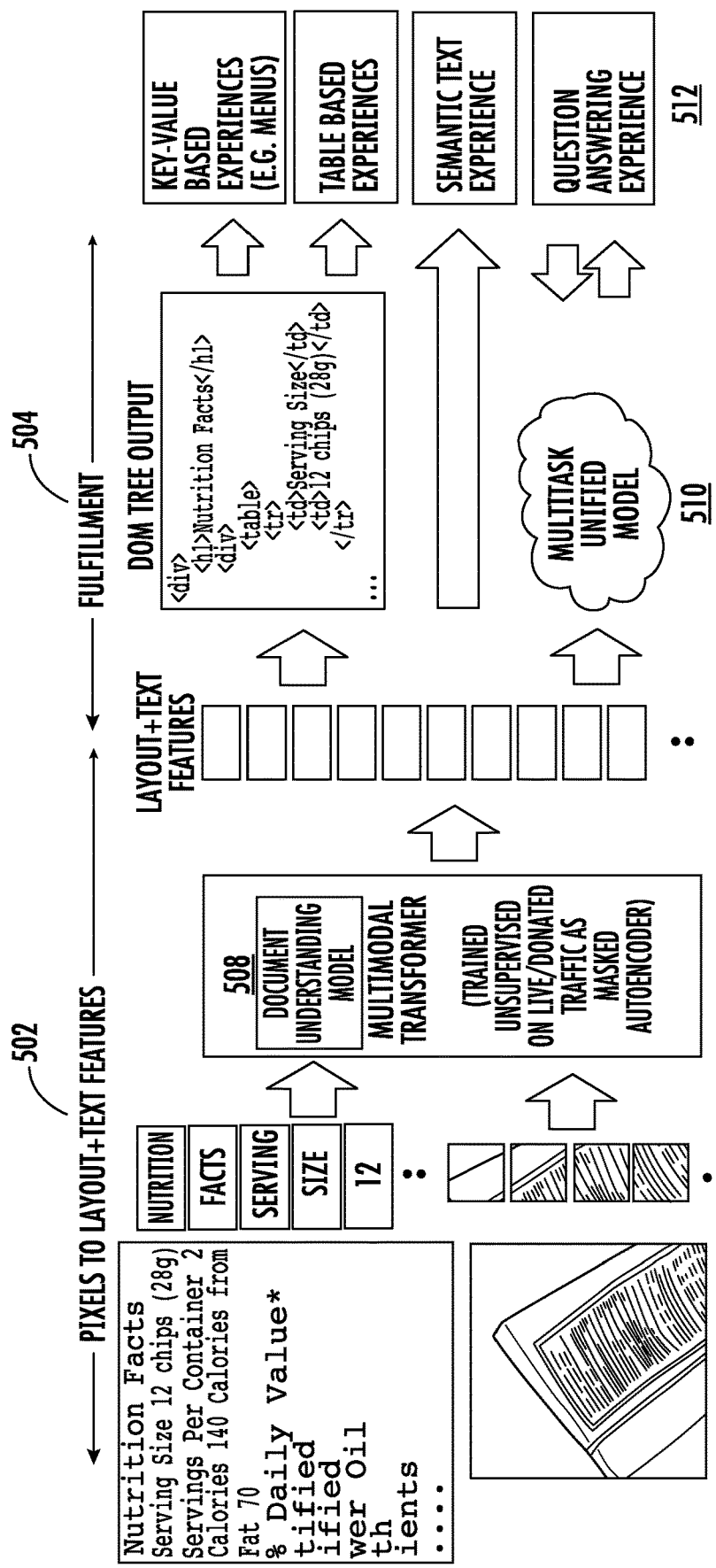
FIG. 5 depicts a block diagram of an example document understanding model according to example embodiments of the present disclosure.

FIG. 5 depicts a block diagram of an example document understanding model 508 according to example embodiments of the present disclosure. In particular, the systems and methods disclosed herein can include a document understanding model 508 for understanding an environment. For example, an image 506 (e.g., an image of a chip bag) can be obtained. The image 506 can be processed with an optical character recognition model to generate text data. The document understanding model 508 can process the image 506 and the text data to generate latent encoding data that may be descriptive of layout and/or text features. The latent encoding data can then be processed to generate output data 512. In some implementations, a multitask unified model 510 may process the latent encoding data to generate the output data 512. The process may include a first portion 502 that processes image 506 to generate latent encoding data. The second portion 504 can include processing the latent encoding data to generate the output data 512. The second portion 504 may include a plurality of different candidate configurations based on the task and/or the features associated with the latent encoding data.

The document understanding model 508 system can include a step function change in text understanding by building a structured representation of documents from pixels. The system may leverage large vision-based transformers. The document understanding model 508 may be configured, trained, and/or tuned to understand full-page context and hierarchical relationships between different text entities. The document understanding model 508 may be configured, trained, and/or tuned for image understanding and may be optionally layered with a multitask unified model (e.g., the multitask unified model of Nayak, "MUM: A new AI milestone for understanding information," The Keyword, Google (May 18, 2021), https://blog.google/products/search/introducing-mum/.) for task fulfillment. In some implementations, the system may leverage heuristics. In some implementations, hierarchical understanding of text entities can be a precursor to solving "full scene understanding" for collections, objects, and/or entities in images.

The system may leverage OCR text, box geometry, and font style for document understanding. Additionally and/or alternatively, the system may leverage structure understanding based on paragraph-segmentation and paragraph ordering. Deep learning approaches (e.g., convolution neural networks (CNNs)) may be utilized to power experiences in translation tasks (e.g., where paragraphs—not words or lines—are the unit of translation) and text selection (e.g., what order do we select text on the page?).

The systems and methods disclosed herein may split the document understanding task into two parts, which may include (1) from the pixels create a structured semantic representation of the text ("Layout+Text Features" 502); and (2) from the structured semantic representation of the text, build fulfillment 504 flows.

The document understanding model 508 can include a multimodal, text-and-image transformer that can extract semantic features that include layout and text information. For example, during pre-training, the document understanding model 508 can be shown only partial image and text input and can be asked to predict the missing patches of image and text. Solving the problem can be reliant on generating an internal representation of the document that includes text, layout, and/or other image features and can then use natural language and/or learned image statistics to complete the missing bits. The representation can then be used for other downstream tasks.

Because the system can be trained by predicting parts of the input image 506, the document understanding model 508 can be trained entirely without labels in an unsupervised fashion. The system may train the document understanding model 508 on a constantly incoming stream of images. The system may be initialized with pre-trained vision and text transformers.

Experiences can be built on top of the semantic representations generated by document understanding model 508 than on unstructured optical character recognition. The system can generate an intermediate structural representation of the document (e.g., an HTML-like representation) from which experiences such as "find vegetarian dishes and their prices" can be generated, because they can be reliant on crawling a document object model tree and extracting the right key-value pairs.

In some implementations, the system can train a readout network directly on the features to build an experience that relies on a semantic understanding of the text in the image 506 (e.g., "extract nutrition information", or "join a diagram with its associated text"). Additionally and/or alternatively, the system can train a large language model (e.g., a multitask unified model 510) to answer questions based on the text in the image 506. Either directly from the features and/or via some intermediate textual representation, the multitask unified model 510 can answer questions on top of tables. In some implementations, the multitask unified model 510 can answer questions on top of the document understanding model 508 semantic features and/or on some intermediate textual representation, making fulfillment 504 even cheaper. Leveraging the multitask unified model 510 and natural language to configure an annotator can make writing fulfillment 504 flows for non-technical users as easy as writing a config.

Since the document understanding model 508 can be pre-trained on a very large image corpus, the system can rely on much smaller amounts of training data for the fulfillment part 504, while the image processing part 502 may be performed by the document understanding model 508. The fulfillment part 504 may map the abstract representation to the final output, which may include one shot learning (i.e., given a single example input-output pair).

Alternatively and/or additionally, since the features are trained on real images, the models may be able to bridge the domain shift between synthetic and real imagery, even when simply training the readouts on synthetic images (e.g., rendered websites and their corresponding HTML). Content with known structure can even be rendered into synthetic scenes and/or real scenes with unknown content "erased" by generative adversarial networks (GANs), which can make the training data generation scalable at constant cost.

FIG. 6A depicts an illustration of an example environment image 602 according to example embodiments of the present disclosure. In particular, the environment image 602 can be an example image that may be processed with the systems and methods disclosed herein to understand the environment and generate augmented images that include visual indicators associated with a generative model response. The environment image 602 can depict an engine compartment of a car that a user may have a question about.

Figure 6B:
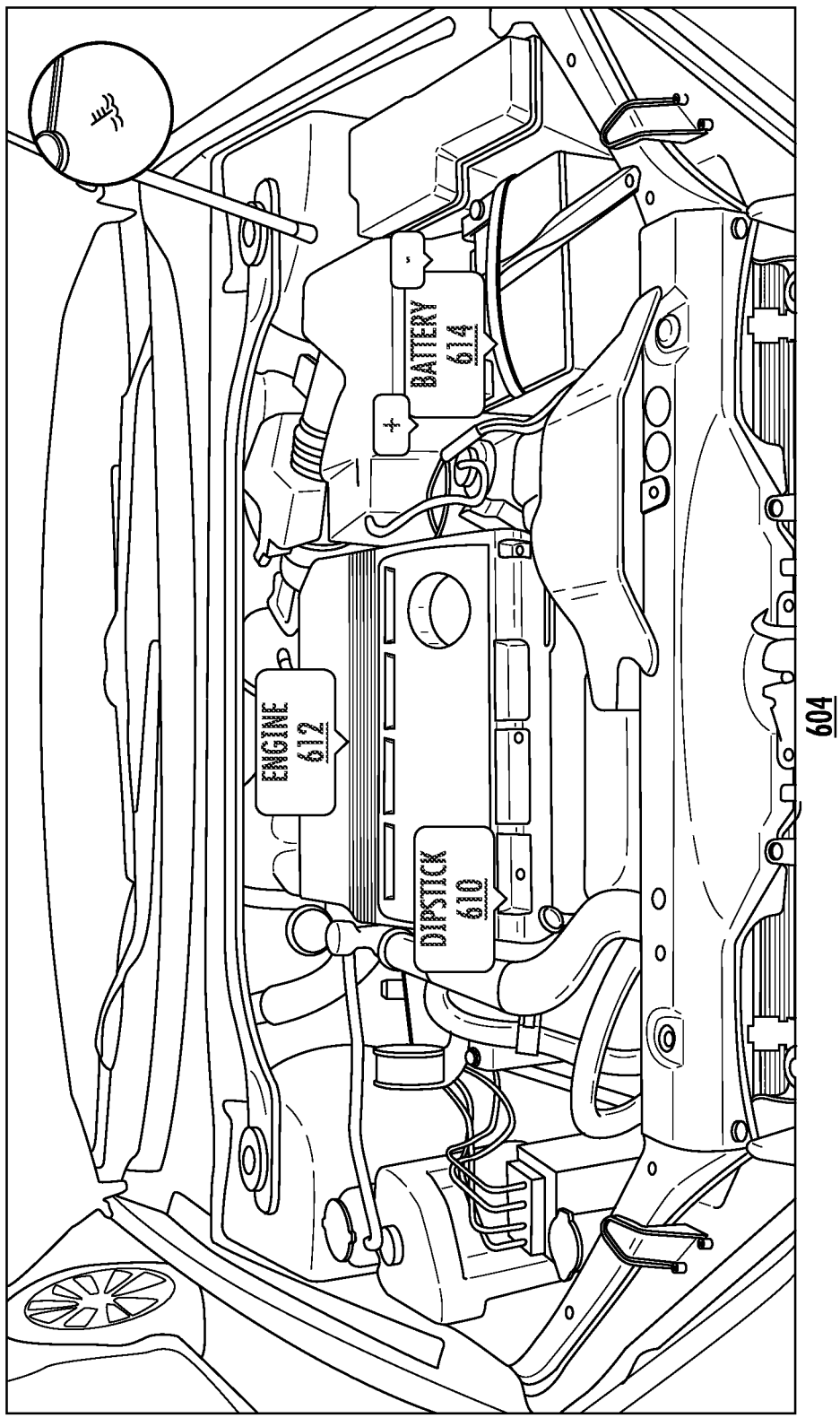
FIG. 6B depicts an illustration of an example first augmented image according to example embodiments of the present disclosure.

FIG. 6B depicts an illustration of an example first augmented image 604 according to example embodiments of the present disclosure. The systems and methods disclosed herein may process the environment image 602 and generate an environment understanding. The environment understanding may be utilized to determine a predicted query. The predicted query (e.g., "What are the objects in this engine compartment?") can be processed with one or more machine-learned models to generate a model-generated response (e.g., the image depicts an engine, 612, a dipstick 610, and a battery 614). The model-generated response and the environment image 602 can be processed to generate a first augmented image 604 that includes a plurality of visual indicators that indicate the objects recognized as relevant to the model-generated response.

Figure 6C:
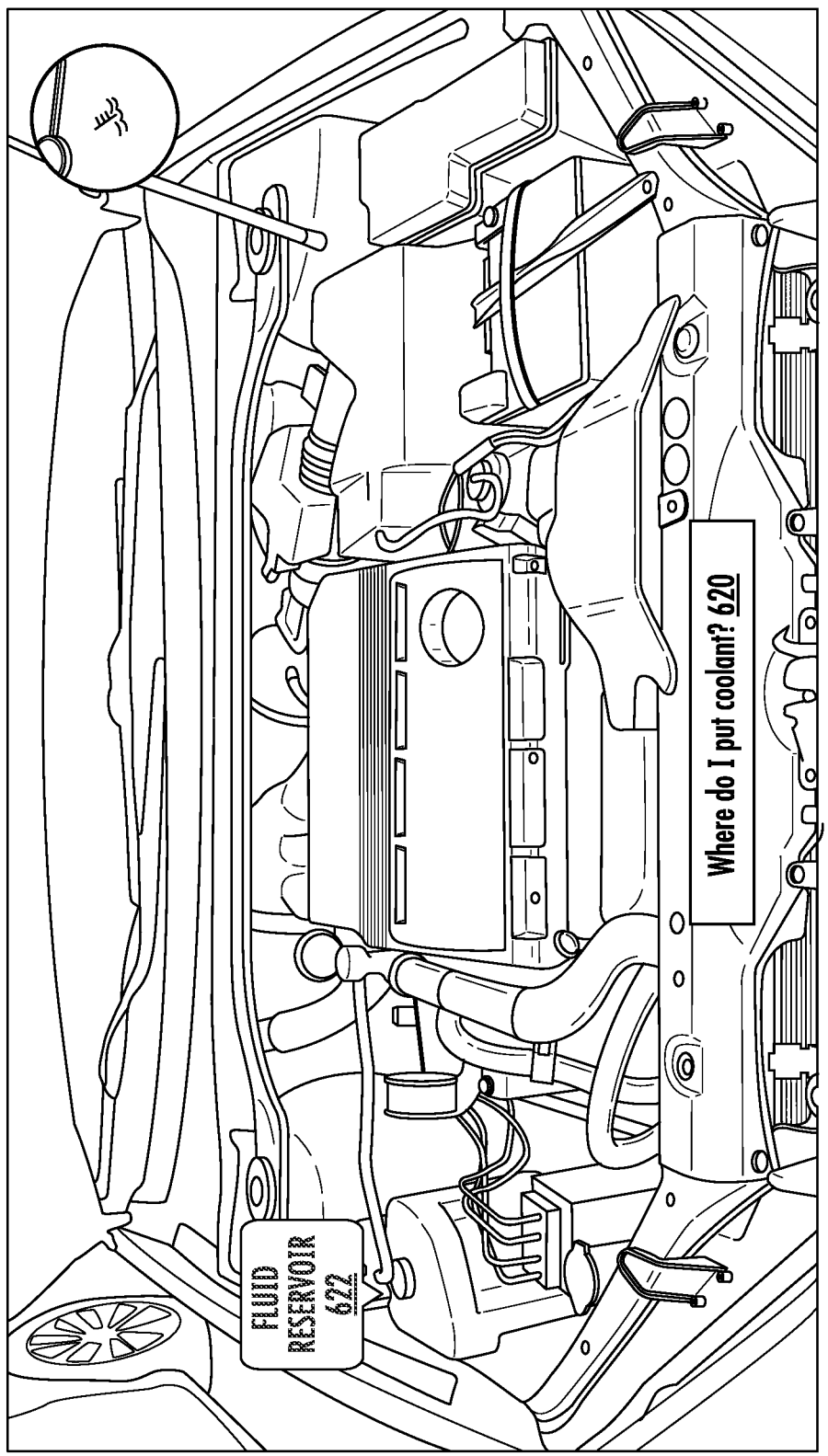
FIG. 6C depicts an illustration of an example second augmented image according to example embodiments of the present disclosure.

FIG. 6C depicts an illustration of an example second augmented image 606 according to example embodiments of the present disclosure. In particular, the systems and methods disclosed herein may process the environment image 602 and a query 620 (e.g., "Where do I put coolant?" received via a voice command obtained via one or more audio sensors) with a generative model (e.g., a vision language model) to generate a model-generated response (e.g., the coolant can be poured in the fluid reservoir in the left side of the engine compartment). The model-generated response and the environment image 602 can then be processed to generate the second augmented image 606. The second augmented image 606 can include a plurality of visual indicators, which can include highlighting the fluid reservoir and providing a fluid reservoir user interface bubble label 622.

Figure 7:
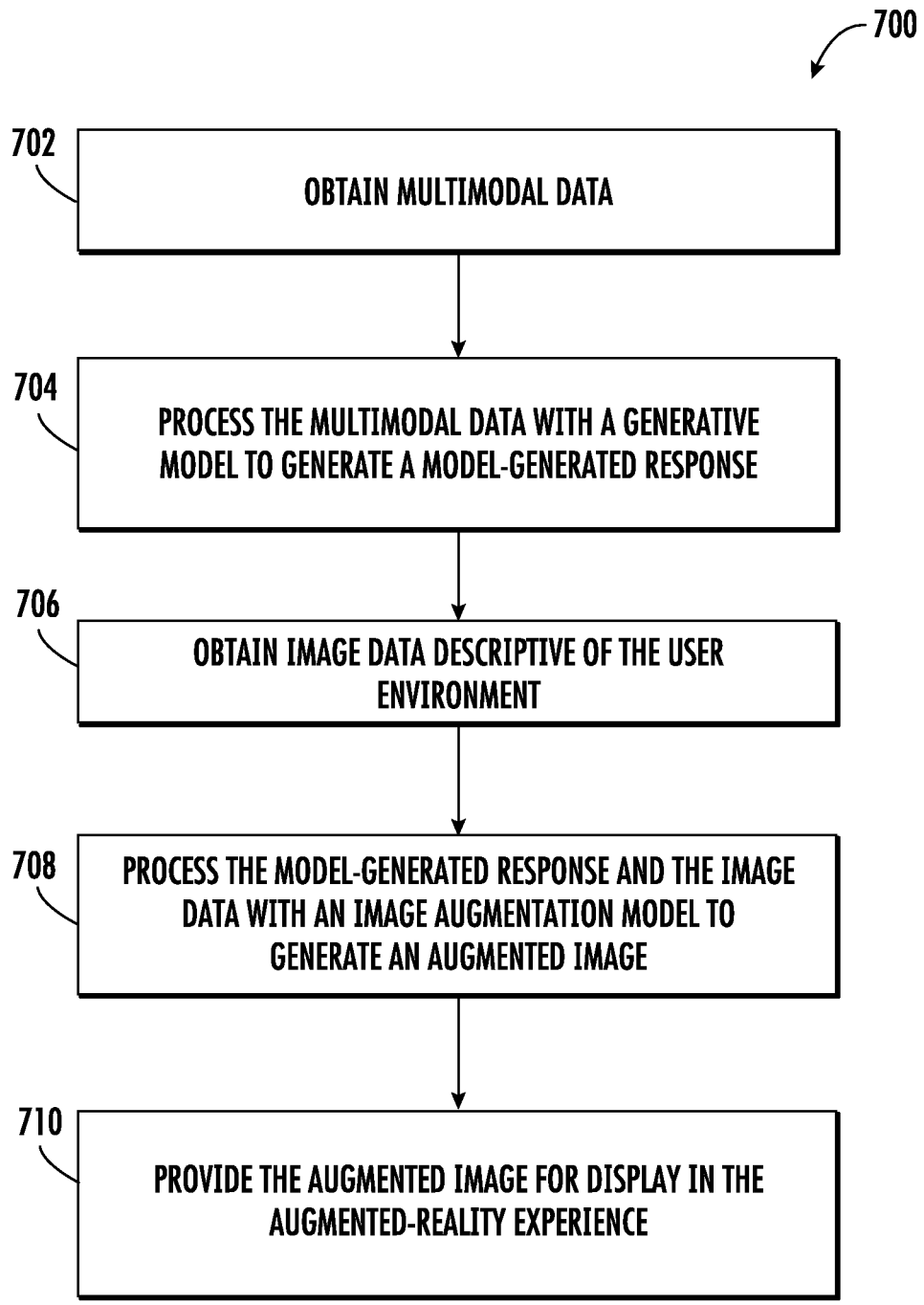
FIG. 7 depicts a flow chart diagram of an example method to perform visual indicator generation according to example embodiments of the present disclosure.

In some implementations, the environment image 602 may be obtained from the web, a user's camera roll, and/or another source. The user may upload and/or select the environment image 602 for processing. In particular, a user may want to learn how to FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain multimodal data. The multimodal data can include a query associated with features in a user environment. In some implementations, the multimodal data can include an input image. The input image can depict at least a portion of the user environment. The user environment can include one or more objects, which may include people, products, structures, animals, plants, and/or other objects. The query can include a request for information about the object in the user environment. The query can include a text string that indicates an object type of interest. The query may be generated based on processing obtained audio to determine a voice command that can then be transcribed. In some implementations, the query may be generated based on one or more user interactions, which may be determined based on a search history, browsing history, purchase history, application history, and/or location history. The query may be generated based on obtaining and processing initial image data. The initial image data may be processed to determine the user has made a gesture and/or determining the user is interacting with a particular object within the user environment.

In some implementations, the computing system can process the input image and/or the query with a vision language model to generate an identification output. Alternatively and/or additionally, the computing system can process the input image and/or the query with a classification model to generate an identification output that may include a classification label. The identification output can be descriptive of an identifier of the object within the user environment. The computing system can provide, before processing the multimodal data with the generative model, the identification output for display. In some implementations, the computing system can process the input image and the identification output to generate an annotated input image. The annotated input image can include the input image with the identifier output overlayed over a portion of the input image. Providing the identification output for display can include providing the annotated input image for display. The annotated input image can be utilized to request object verification from the user. The processing may be continued based on a user providing object verification via an input, lack of input, and/or acknowledgement. In some implementations, the computing system may obtain a correction input, and the computing system may crop the input image based on the correction input.

At 704, the computing system can process the multimodal data with a generative model to generate a model-generated response. The generative model can include a machine-learned language model. The generative model can include a vision language model that may be configured, trained, and/or tuned to process text data and image data and generate text data, embedding data, and/or image data. In some implementations, the generative model may be communicatively connected with a search engine, a fine-grained instance-level classification model, a segmentation model, a detection model, an embedding model, a rendering engine, other processing engines, and/or other models. The model-generated response can include a predicted response to the query. The model-generated response can include a plurality of predicted features, which may include predicted text features, predicted image features, predicted audio features, and/or other predicted features. The features may include a novel set of features that may differ from the features in the inputs, the features in the training dataset for the generative model, and/or features obtained from a search engine and/or a database. The model-generated response can be associated with an object.

In some implementations, the computing system can process the input image with a detection model to generate a plurality of bounding boxes. The plurality of bounding boxes can be associated with a plurality of detected objects within the input image. The computing system can generate a plurality of image segments based on the plurality of bounding boxes. Each image segment of the plurality of image segments can be associated with a different detected object of the plurality of detected objects. At least a subset of the plurality of image segments may be processed with the generative model to generate the model-generated response. In some implementations, the computing system can process the plurality of image segments with a classification model to generate a plurality of object classifications. The computing system can determine a particular object classification of the plurality of object classifications is associated with the object type of interest. The computing system can then provide the particular object classification for display.

At 706, the computing system can obtain image data descriptive of the user environment. The image data can depict at least a portion of the user environment. The image data may include the input image and/or may be descriptive of images obtained and/or generated after the input image. The image data may be obtained and/or generated with a mobile computing device, which may include a smartphone, a smart watch, smart glasses, a tablet, and/or other mobile computing devices. The image data may be associated with a live camera feed.

At 708, the computing system can process the model-generated response and the image data with an image augmentation model to generate an augmented image. The augmented image can be descriptive of the user environment annotated based on the model-generated response. The image augmentation model can annotate the image data based on detecting the object in the image data. The image annotation model may include a detection model, a segmentation model, a classification model, a rendering engine, a generative model, an augmentation model, and/or other models. The augmented image may include model-generated image data (e.g., predicted pixels), may include one or more user interface elements, may include object highlighting, may include a sequence of text, may include diagrams, and/or may include animated graphics.

At 710, the computing system can provide the augmented image for display in the augmented-reality experience. The augmented image may be provided in an augmented-reality experience, a virtual-reality experience, and/or as a stand-alone output. In some implementations, a plurality of augmented images may be generated and/or provided via a list, a slideshow, a video, and/or a diagram.

Figure 8:
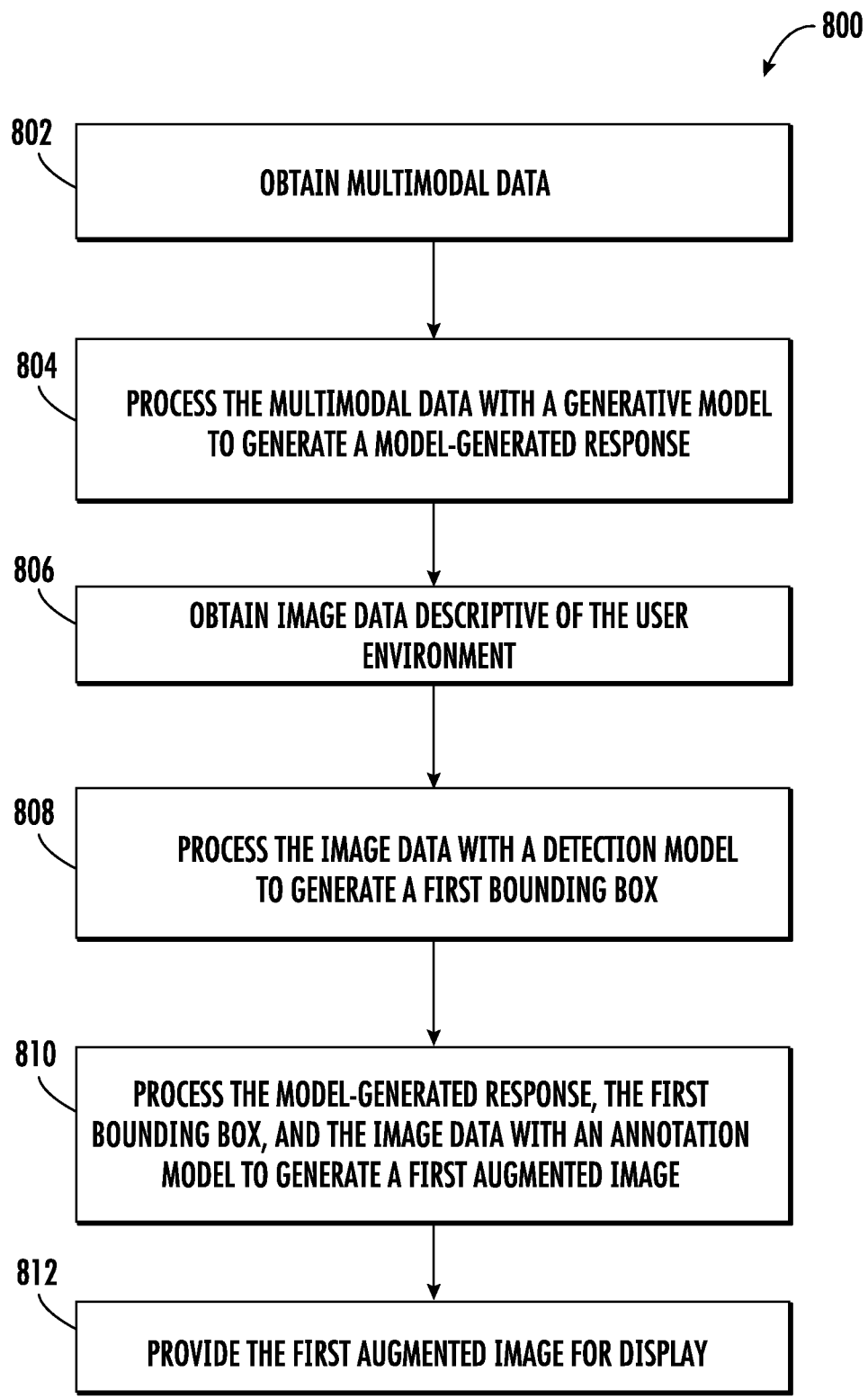
FIG. 8 depicts a flow chart diagram of an example method to perform multi-part response generation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain multimodal data. The multimodal data can include a query associated with features in a user environment. The multimodal data can include an input image. In some implementations, the input image can depict at least a portion of the user environment. The multimodal data may be continually obtained and/or processed. Alternatively and/or additionally, the multimodal data may be obtained based on opening a particular application, via a manual input, and/or a selection of one or more particular user interface elements.

At 804, the computing system can process the multimodal data with a generative model to generate a model-generated response. The generative model can include a machine-learned language model. The model-generated response can include a predicted response to the query. In some implementations, the model-generated response can be associated with a plurality of objects. The model-generated response can include a multi-part response (e.g., a response that includes a plurality of steps for performing a task that is responsive to the query). Different parts of the multi-part response may be associated with different objects of the plurality of objects. In some implementations, a portion of the model-generated response may be based on one or more search results obtained based on the generative model interacting with a search engine. The query can be associated with a request for instructions on how to interact with the plurality of objects within the user environment. In some implementations, the model-generated response can include a sequence of actions for performing interactions with the plurality of objects. The query can be descriptive of a diagnostic request associated with a product. The model-generated response can include a plurality of actions for fixing the product. In some implementations, the first object can be associated with a first part of the product. The second object can be associated with a second part of the product.

At 806, the computing system can obtain image data descriptive of the user environment. The image data can depict at least a portion of the user environment. The user environment may include a user's room, an outdoor setting, an indoor setting, a garage, and/or other environment. The image data may be associated with a view direction of a user. The image data may be associated with a plurality of images to be processed.

At 808, the computing system can process the image data with a detection model to generate a first bounding box. The first bounding box can be descriptive of a position of a first object of the plurality of objects within the image data. The detection model may include a machine-learned detection model that was configured, trained, and/or tuned to detect objects (and/or a particular object) within an image. The first bounding box may indicate a region of the image that includes the first object. In some implementations, the plurality of images of the image data may be processed to generate a plurality of bounding boxes associated with the plurality of images.

At 810, the computing system can process the model-generated response, the first bounding box, and the image data with an annotation model to generate a first augmented image. The first augmented image can depict the user environment annotated based on a first part of the model-generated response. In some implementations, the first augmented image can include a first annotation that indicates the position of the first object of the plurality of objects within the image data. Additionally and/or alternatively, the plurality of images, the model-generated response, and/or the plurality of bounding boxes may be processed with the annotation model to generate a plurality of augmented images. The plurality of augmented images may include annotations associated with the different parts of the multi-part response arranged in a chronological sequence.

At 812, the computing system can provide the first augmented image for display. The first augmented image may be provided for display in a viewfinder of a mobile computing device, in an image gallery, in an application user interface, and/or via another medium. In some implementations, the first augmented image may be provided in and/or adjacent to a camera feed.

In some implementations, the computing system can process the image data with the detection model to generate a second bounding box. The second bounding box can be descriptive of a position of a second object of the plurality of objects within the image data. The computing system can process the model-generated response, the second bounding box, and the image data with an annotation model to generate a second augmented image. In some implementations, the second augmented image can depict the user environment annotated based on a second part of the model-generated response. The second augmented image can include a second annotation that indicates the position of the second object of the plurality of objects within the image data. The computing system can provide the second augmented image for display.

Figure 9A:
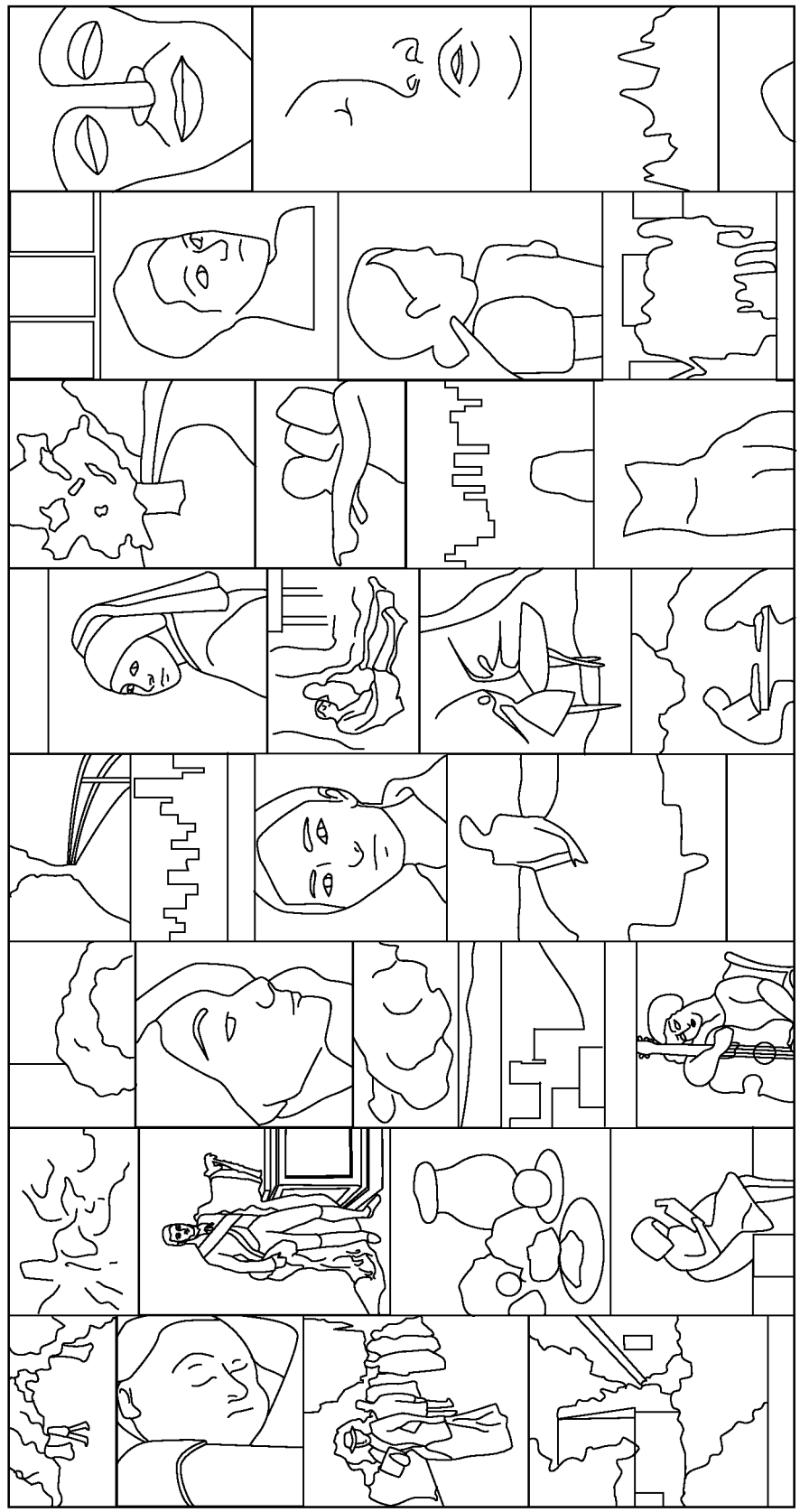
FIG. 9A depicts an illustration of an example multimodal input associated with an identification request according to example embodiments of the present disclosure.

FIG. 9A depicts an illustration of an example multimodal input associated with an identification request according to example embodiments of the present disclosure. The multimodal input can be obtained and processed with the image annotation system to generate an augmented image that includes visual indicators of a generative model response to the multimodal input. The multimodal input can include a query 900 (e.g., "Which ones are impressionism?") and an input image 902 (e.g., an image of a collage of different paintings). The multimodal input can be processed to generate the multimodal response of FIG. 9B.

FIG. 9B depicts an illustration of an example multimodal response associated with identifications according to example embodiments of the present disclosure. In particular, the multimodal response can be provided via a search results page. The search results page can include a query input box 904 (that may include an indicator of the query 900), a text response 906 descriptive of the model-generated response in a natural language format, an augmented image 908, first additional information 910 associated with a first identified object, second additional information 912 associated with a second identified object, and a suggested actions carousel 914.

The text response 906 may be generated by obtaining search results associated with a topic and generating a summary of the extracted information. The augmented image 908 can include visual indicators that indicate regions of the input image 902 that are responsive to the query 900 (e.g., the paintings in the collage that are considered impressionism). The first additional information 910 can include further details (e.g., a title, an artist, and/or a selectable user interface to navigate to a search results page and/or web resource associated with the first object) on a first object in the input image 902 that was determined to be responsive to the query 900. The second additional information 912 can include further details (e.g., a title, an artist, and/or a selectable user interface to navigate to a search results page and/or web resource associated with the second object) on a second object in the input image 902 that was determined to be responsive to the query 900. The suggested actions carousel 914 can include an action option to provide a follow-up query, an augmented-reality option, and/or may include one or more suggested queries.

Figure 10A:
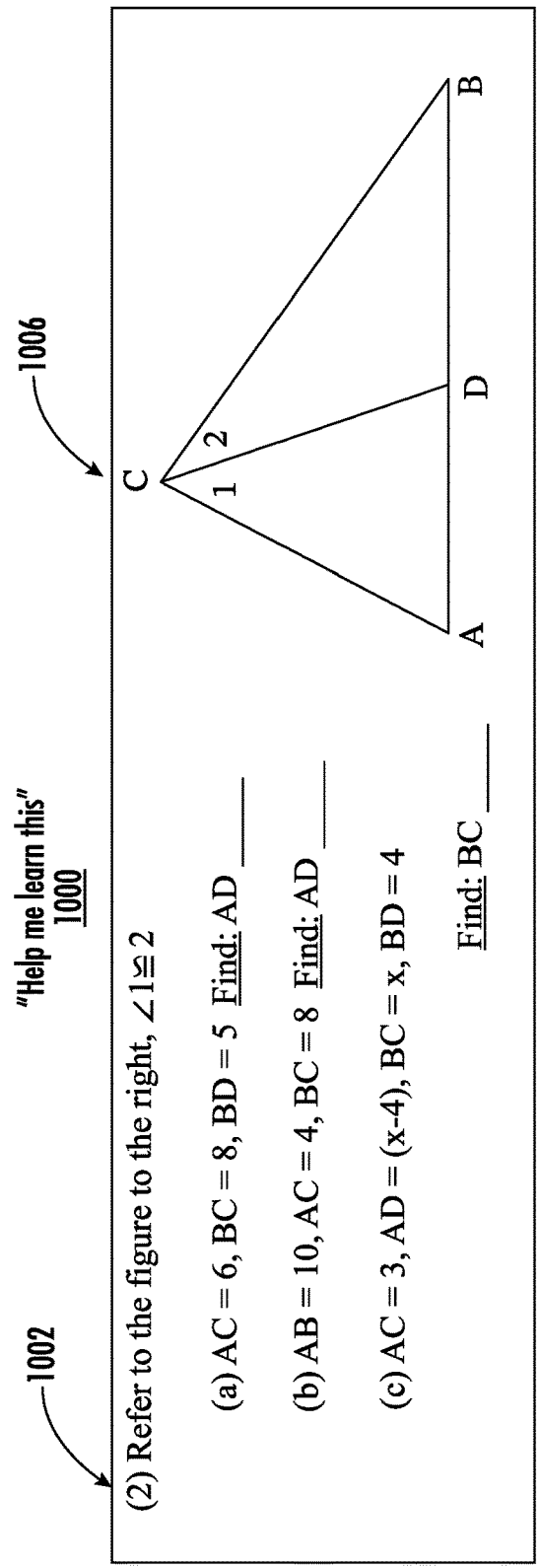
FIG. 10A depicts an illustration of an example multimodal input associated with a geometry problem according to example embodiments of the present disclosure.

FIG. 10A depicts an illustration of an example multimodal input associated with a geometry problem according to example embodiments of the present disclosure. The multimodal input can be obtained and processed with the image annotation system to generate an augmented image that includes visual indicators of a generative model response to the multimodal input. The multimodal input can include a prompt 1000 (e.g., "Help me learn this") and an input image 1002 (e.g., an image of a math problem with a diagram and characters). The multimodal input can be processed to generate the multimodal response of FIG. 10B.

Figure 10B:
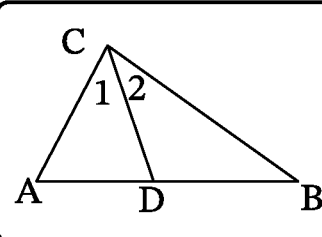
FIG. 10B depicts an illustration of an example multimodal response to the geometry question according to example embodiments of the present disclosure.

FIG. 10B depicts an illustration of an example multimodal response to the geometry question according to example embodiments of the present disclosure. In particular, the multimodal response can be provided via a response page. The response page can include a prompt input box 1010 (that may include an indicator of the prompt 1000), a text response 1012 descriptive of a summary of the topic of the prompt 1000 in a natural language format, an augmented image 1014, a document breakdown 1016, and a suggested actions carousel 1018.

The text response 1012 may be generated by obtaining search results associated with a topic and generating a summary of the extracted information. The augmented image 1014 can include visual indicators that indicate regions of the input image 1002 that are relevant to the model-generated response, which may include highlighting the diagram and the question parts. The document breakdown 1016 can include a plurality of expandable panels associated with the different questions identified from the input image 1002. The expandable panels may be selectable to expand the panel to display a detailed explanation of how to solve the particular problem associated with that panel. The suggested actions carousel 1018 can include an action option to provide a follow-up query, an augmented-reality option, and/or may include one or more suggested queries.

Figure 11A:
FIG. 11A depicts an illustration of an example multimodal input associated with a verification request according to example embodiments of the present disclosure.

FIG. 11A depicts an illustration of an example multimodal input associated with a verification request according to example embodiments of the present disclosure. The multimodal input can be obtained and processed with the image annotation system to generate an augmented image that includes visual indicators of a generative model response to the multimodal input. The multimodal input can include a query 1102 (e.g., "Is this real?") and an input image 1104 (e.g., an image of a potentially altered image of two individuals). The multimodal input can be processed to generate the multimodal response of FIG. 11B.

Figure 11B:
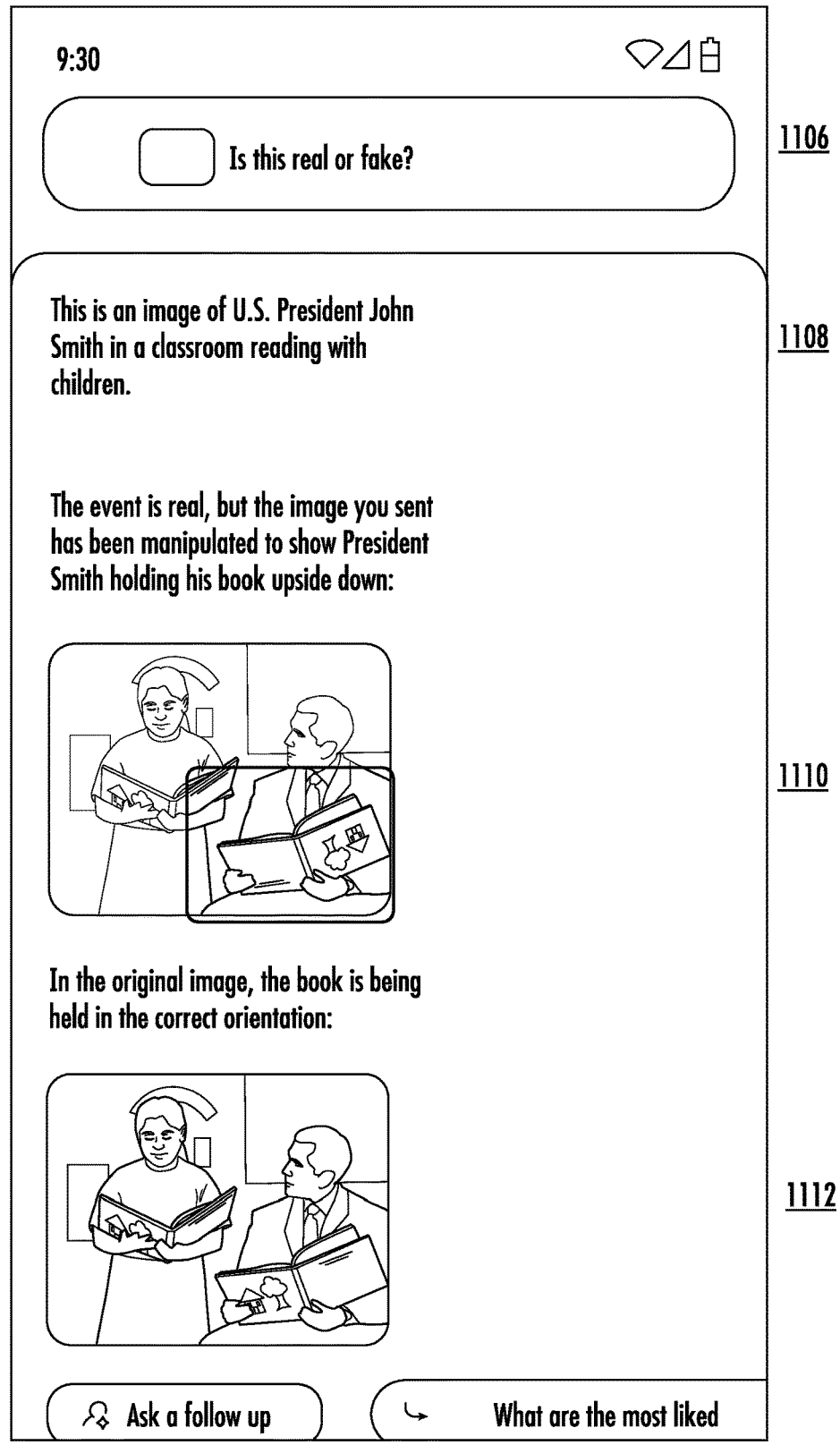
FIG. 11B depicts an illustration of an example multimodal response associated with a verification according to example embodiments of the present disclosure.

FIG. 11B depicts an illustration of an example multimodal response associated with a verification according to example embodiments of the present disclosure. In particular, the multimodal response can be provided via a search results page. The search results page can include a query input box 1106 (that may include an indicator of a model-generated query that may be generated by determining an intent of the query 1102), a text response 1108 descriptive of a summary of the topic and the model-generated response in a natural language format, an augmented image 1110, and the original, unaltered image 1112.

The text response 1108 may be generated by obtaining search results associated with a topic and generating a summary of the extracted information. Additionally and/or alternatively, the text response 1108 may include a model-generated response summary that may be generated by processing the query 1102 and the input image 1104 with one or more machine-learned models, which may include one or more generative models. The augmented image 1110 can include visual indicators that indicate regions of the input image 1104 that are relevant to the model-generated response (e.g., the region determined to be altered and indicative of the input image 1104 being fake). The original unaltered image 1112 may be obtained based on a visual search performed via one or more search engines and may have been leveraged for generating the model-generated response.

Figure 12A:
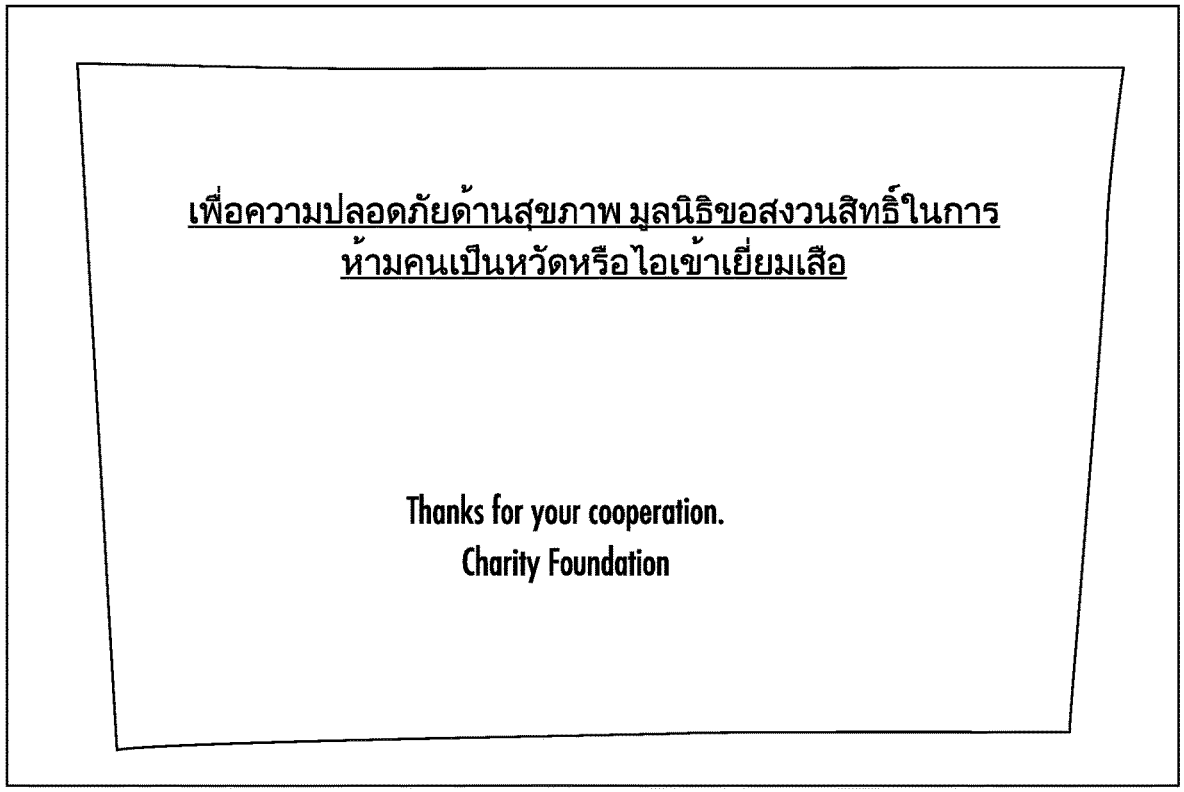
FIG. 12A depicts an illustration of an example multimodal input associated with a translation task according to example embodiments of the present disclosure.

FIG. 12A depicts an illustration of an example multimodal input associated with a translation task according to example embodiments of the present disclosure. The multimodal input can be obtained and processed with the image annotation system to generate an augmented image that includes visual indicators of a generative model response to the multimodal input. The multimodal input can include a query 1202 (e.g., "What does this say?") and an input image 1204 (e.g., an image of a plurality of characters in a language not native to the user). The multimodal input can be processed to generate the multimodal response of FIG. 12B.

Figure 12B:
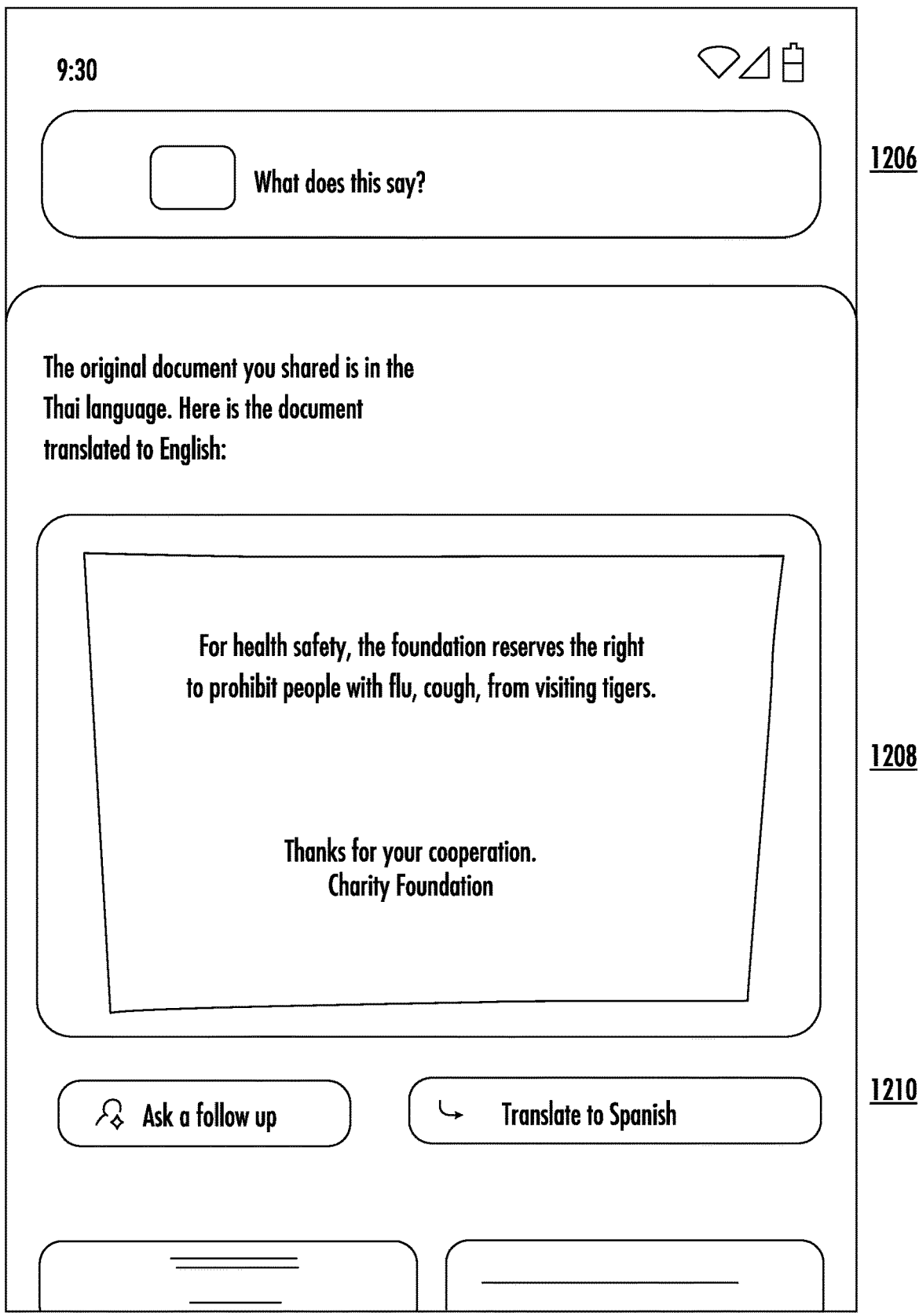
FIG. 12B depicts an illustration of an example multimodal response associated with a translation according to example embodiments of the present disclosure.

FIG. 12B depicts an illustration of an example multimodal response associated with a translation according to example embodiments of the present disclosure. In particular, the multimodal response can be provided via a search results page. The search results page can include a query input box 1206 (that may include an indicator of the query 1102), a text response descriptive of a summary of the task in a natural language format, an augmented image 1208, and a suggested actions carousel 1210.

The augmented image 1208 can include visual indicators that replace regions of the input image 1204 that are relevant to the model-generated response (e.g., the region with non-native language characters) with predicted pixels descriptive of a translation of the original characters. The suggested actions carousel 1210 can include an action option to provide a follow-up query, an augmented-reality option, and/or may include one or more suggested queries.

There can be visual questions where delivering the answer alongside or on top of the input can be useful (e.g., product ratings and/or translations). An overlay and/or AR style approach for delivering answers in context can be helpful in these implementations. For complex questions where the input image is relevant, toggling back and forth between a search results page and visual query formulation may not be efficient to consume results. One option may include extracting relevant portions of the input image and echoing them back in the search results page as part of the response.

The systems and methods for providing visual indicators can leverage annotations, extraction, and/or transformation for generating the augmented images with the visual indicators. The annotations can include a paint additive user interface on top of the original image to show or tell a user something (e.g., "Where's Waldo in this picture?"). The extraction can include distilling a complex input into tractable pieces and intents (e.g., extracting multi-part homework questions where several questions refer to one diagram), which can then be acted upon (e.g., generating a plurality of application programming interface calls that can be utilized to perform a plurality of tasks associated with a plurality of different models, engines, platforms, and/or applications). The transformation may include transforming the original image and making the original image different in some way (e.g., "Translate this to English").

Figure 13A:
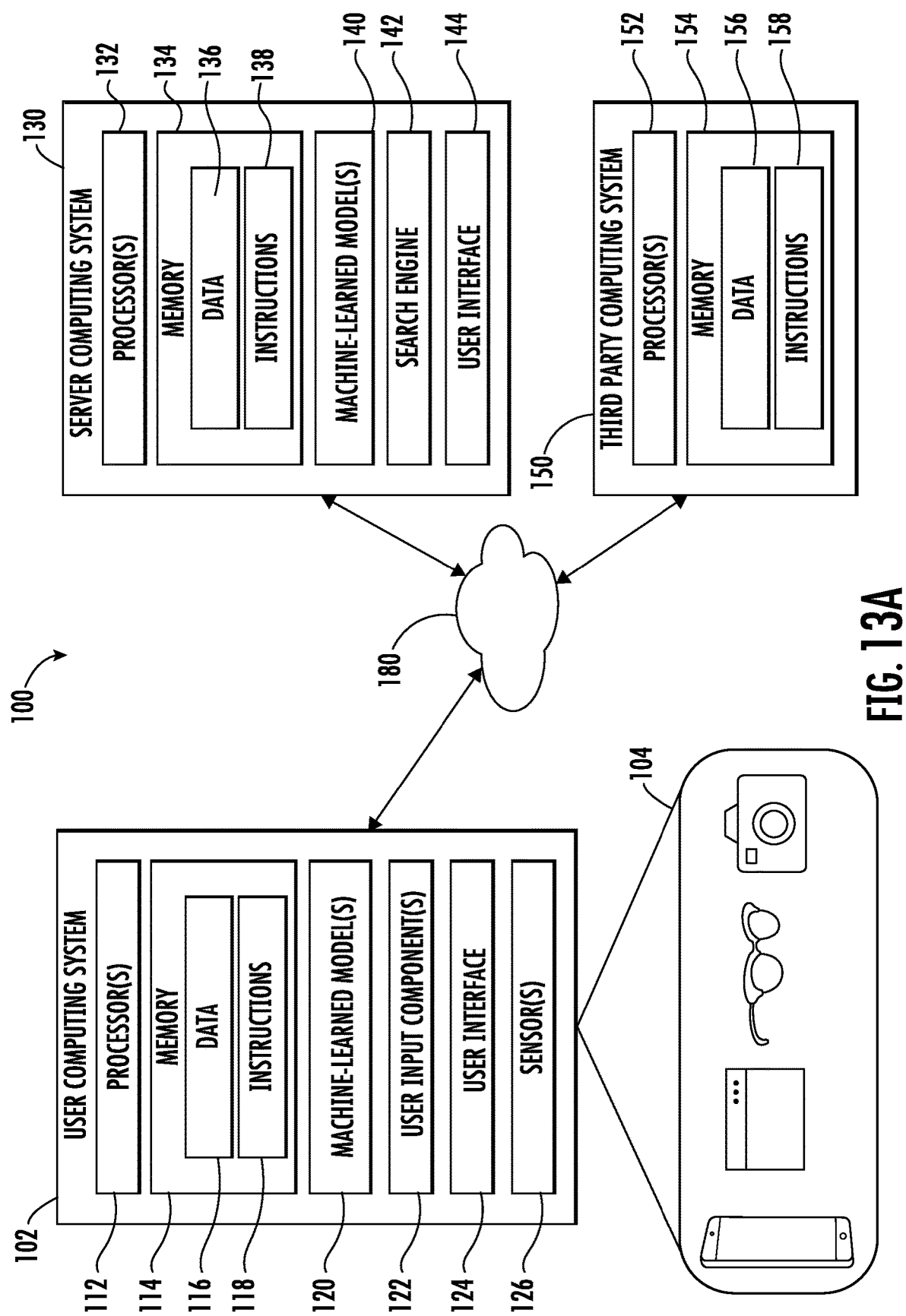
FIG. 13A depicts a block diagram of an example computing system that performs model-generated response-based annotations according to example embodiments of the present disclosure.

FIG. 13A depicts a block diagram of an example computing system 100 that performs model-generated response-based annotations according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or pe part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 13B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 13B:
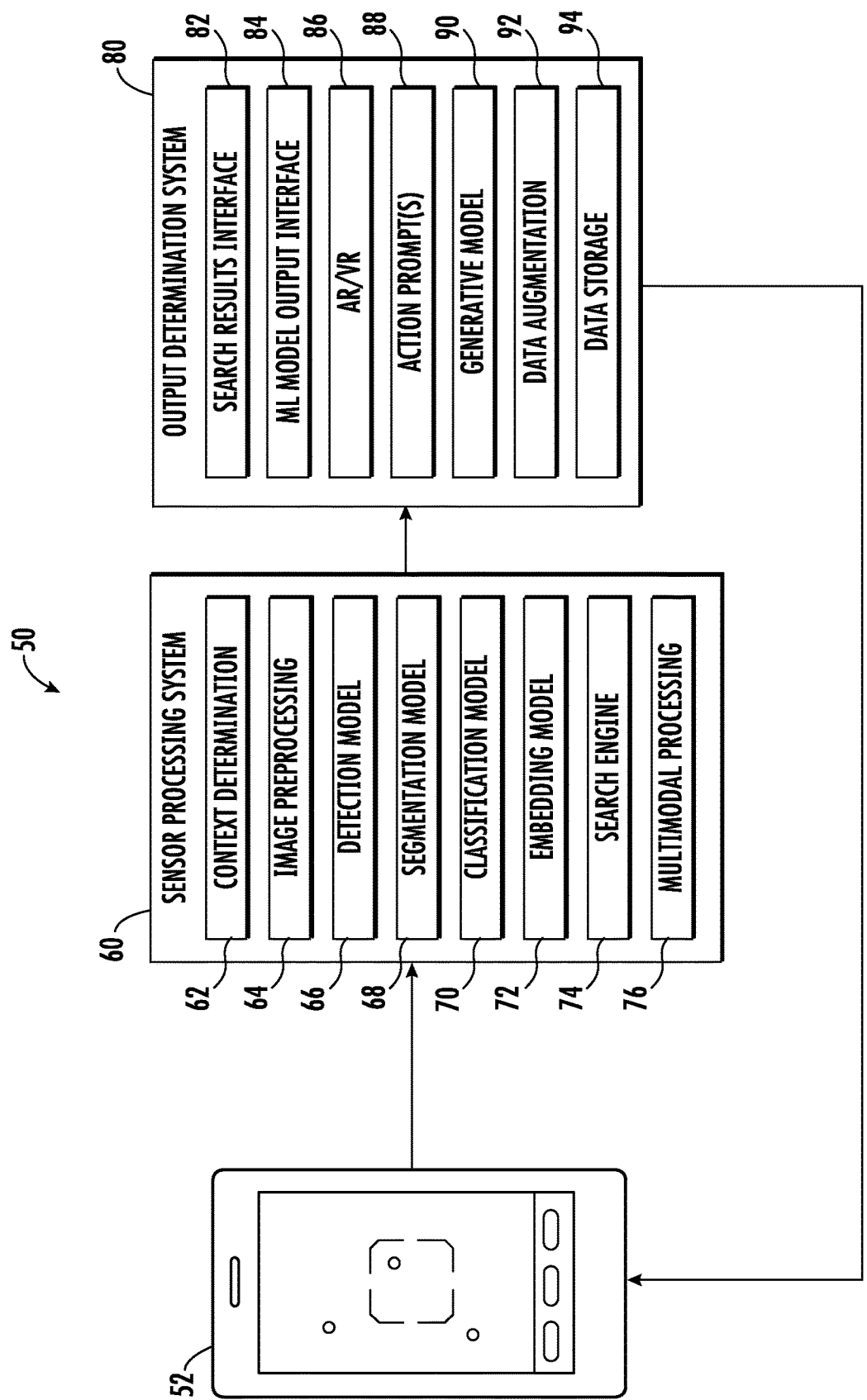
FIG. 13B depicts a block diagram of an example computing system that performs model-generated response-based annotations according to example embodiments of the present disclosure.

FIG. 13B depicts a block diagram of an example computing system 50 that performs model-generated response-based annotations according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 90 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 90 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 90 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 90 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 90 may include a vision language model.

The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g. for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for augmented-reality annotations, the system comprising:
    one or more processors; and
    one or more non-transitory computer-readable media that collectively store instructions that, when executed by the one or more processors, cause the computing system to perform operations, the operations comprising:
        obtaining a user input, wherein the user input comprises a query associated with a user environment;
        obtaining image data descriptive of the user environment, wherein the image data depicts at least a portion of the user environment;
        processing the query and the image data with a vision language model to generate a model-generated query;
        processing the model-generated query with a search engine to determine a plurality of search results;
        processing the user input and at least a subset of the plurality of search results with a generative model to generate a model-generated response, wherein the generative model comprises a machine-learned autoregressive language model, wherein the model-generated response comprises a predicted response to the query, and wherein the model-generated response is associated with an object;
        processing the model-generated response and the image data with an image augmentation model to generate an augmented image, wherein the augmented image is descriptive of the user environment annotated based on the model-generated response, and wherein the image augmentation model annotates the image data based on detecting the object in the image data; and
        providing the augmented image for display.

2. The system of claim 1, wherein the operations further comprise:
    obtaining additional image data descriptive of the user environment;
    processing the additional image data and the model-generated response with the generative model to generate an updated model-generated response;
    processing the additional image data and the updated model-generated response with the image augmentation model to generate an updated augmented image, wherein the updated augmented image is descriptive of the user environment annotated based on the updated model-generated response; and
    providing the updated augmented image for display.

3. The system of claim 2, wherein the model-generated response comprises a multi-part response, wherein the multi-part response is descriptive of a sequence of actions to perform to interact with the object in the user environment to perform an interaction associated with the query.

4. The system of claim 3, wherein the augmented image is associated with providing first instructions associated with a first action of the sequence of actions, and wherein the updated augmented image is associated with providing second instructions associated with a second action of the sequence of actions.

5. The system of claim 2, wherein processing the additional image data and the updated model-generated response with the image augmentation model is performed in response to:
    determining, based on the additional image data, a first action is associated with a sequence of actions of the model-generated response was performed.

6. The system of claim 1, wherein processing the model-generated response and the image data with the image augmentation model comprises:
    processing the model-generated response and the image data with the image augmentation model to generate a plurality of augmented images, wherein the model-generated response comprises a multi-part response, and wherein each of the plurality of augmented images is associated with a respective part of the multi-part response.

7. The system of claim 6, wherein the operations further comprise:
    processing the model-generated response and the plurality of augmented images to generate a multimodal response output; and
    providing the multimodal response output for display.

8. The system of claim 7, wherein the multimodal response output comprises step-by-step instructions for performing a task, wherein the plurality of augmented images comprise annotations associated with actions to perform as part of the step-by-step instructions, and wherein the plurality of augmented images are provided adjacent to text instructions.

9. The system of claim 1, wherein the generative model comprises the vision language model, wherein the vision language model comprises a text encoder, an image encoder, and a text decoder, and wherein the generative model is communicatively connected with a search engine.

10. The system of claim 1, wherein the augmented image is provided for display via an augmented-reality experience, wherein the augmented image comprises an annotation that indicates a position of the object within the image data, and wherein the annotation comprises text data associated with the model-generated response.

11. A computer-implemented method for providing a response in an augmented-reality experience, the method comprising:
    obtaining, by a computing system comprising one or more processors, multimodal data, wherein the multimodal data comprises a query associated with features in a user environment, and wherein the multimodal data comprises an input image, wherein the input image depicts at least a portion of the user environment;
    processing, by the computing system, the query and the input image with a vision language model to generate a model-generated query;
    processing, by the computing system, the input image and the model-generated query with a search engine to determine a plurality of search results;
    processing, by the computing system, the multimodal data and at least a subset of the plurality of search results with a generative model to generate a model-generated response, wherein the generative model comprises a machine-learned autoregressive language model, wherein the model-generated response comprises a predicted response to the query, wherein the model-generated response comprises instructions for performing a sequence of actions, and wherein the model-generated response is associated with a plurality of objects;
    obtaining, by the computing system, image data descriptive of the user environment, wherein the image data depicts at least a portion of the user environment;
    processing, by the computing system, the model-generated response and the image data with an image augmentation model to generate a plurality of augmented images, wherein the plurality of augmented images are descriptive of the user environment annotated based on the model-generated response, and wherein the image augmentation model annotates the image data based on detecting the plurality of objects in the image data; and
    providing, by the computing system, the plurality of augmented images for display in the augmented-reality experience in stages based on the sequence of actions associated with the instructions, wherein the augmented-reality experience is updated based on determining an environment change.

12. The method of claim 11, wherein the query comprises a request for information about the object in the user environment, and wherein the query comprises a text string that indicates an object type of interest.

13. The method of claim 12, further comprising:
    processing, by the computing system, the input image and the query with the vision language model to generate an identification output, wherein the identification output is descriptive of an identifier of the object within the user environment; and
    providing, by the computing system and before processing the multimodal data with the generative model, the identification output for display.

14. The method of claim 13, further comprising:
    processing, by the computing system, the input image and the identification output to generate an annotated input image, wherein the annotated input image comprises the input image with the identifier output overlayed over a portion of the input image; and
    wherein providing the identification output for display comprises:
    providing, by the computing system, the annotated input image for display.

15. The method of claim 12, further comprising:
    processing, by the computing system, the input image with a detection model to generate a plurality of bounding boxes, wherein the plurality of bounding boxes are associated with a plurality of detected objects within the input image; and
    generating, by the computing system, a plurality of image segments based on the plurality of bounding boxes, wherein each image segment of the plurality of image segments is associated with a different detected object of the plurality of detected objects;
    wherein at least a subset of the plurality of image segments are processed with the generative model to generate the model-generated response.

16. The method of claim 15, further comprising:
    processing, by the computing system, the plurality of image segments with a classification model to generate a plurality of object classifications;
    determining, by the computing system, a particular object classification of the plurality of object classifications is associated with the object type of interest; and
    providing, by the computing system, the particular object classification for display.

17. One or more non-transitory computer-readable media that collectively store instructions that, when executed by one or more computing devices, cause the one or more computing devices to perform operations, the operations comprising:
    obtaining multimodal data, wherein the multimodal data comprises a query associated with features in a user environment, and wherein the multimodal data comprises an input image, wherein the input image depicts at least a portion of the user environment;
    processing the query and the input image with a vision language model to generate a model-generated query, wherein the vision language model comprises a pre-trained large language model tuned to perform masked-language modeling and multimodal fusing with cross attention;
    processing the input image and the model-generated query with a search engine to determine a plurality of search results;
    processing the multimodal data and at least a subset of the plurality of search results with a generative model to generate a model-generated response, wherein the generative model comprises a machine-learned language model, wherein the model-generated response comprises a predicted response to the query, wherein the model-generated response is associated with a plurality of objects, and wherein the model-generated response comprises a multi-part response, wherein different parts of the multi-part response are associated with different objects of the plurality of objects;
    processing, by the computing system, the model-generated response with an image generation model to generate predicted pixel data;

obtaining image data descriptive of the user environment, wherein the image data depicts at least a portion of the user environment;

processing the image data with a detection model to generate a first bounding box, wherein the first bounding box is descriptive of a position of a first object of the plurality of objects within the image data;

processing the model-generated response, the first bounding box, the predicted pixel data, and the image data with an annotation model to generate a first augmented image, wherein the first augmented image depicts the user environment annotated based on a first part of the model-generated response, wherein the augmented image data comprises at least a portion of the image data augmented based on the predicted pixel data, and wherein the first augmented image further comprises a first annotation that indicates the position of the first object of the plurality of objects within the image data; and providing the first augmented image for display.

18. The one or more non-transitory computer-readable media of claim 17, wherein the operations further comprise:

processing the image data with the detection model to generate a second bounding box, wherein the second bounding box is descriptive of a position of a second object of the plurality of objects within the image data;

processing the model-generated response, the second bounding box, and the image data with an annotation model to generate a second augmented image, wherein the second augmented image depicts the user environment annotated based on a second part of the model-generated response, and wherein the second augmented image comprises a second annotation that indicates the position of the second object of the plurality of objects within the image data; and providing the second augmented image for display.

19. The one or more non-transitory computer-readable media of claim 18, wherein the query is associated with a request for instructions on how to interact with the plurality of objects within the user environment, and wherein the model-generated response comprises a sequence of actions for performing interactions with the plurality of objects, wherein the first augmented image comprises first instructions associated with a first action of the sequence of actions, and wherein the second augmented image comprises second instructions associated with a second action of the sequence of actions.

20. The one or more non-transitory computer-readable media of claim 17, wherein the query is descriptive of a diagnostic request associated with a product, wherein the model-generated response comprises a plurality of actions for fixing the product, wherein the first object is associated with a first part of the product, and wherein a second object is associated with a second part of the product.

* * * * *